US012712991B2

(12) United States Patent
Take

(10) Patent No.: US 12,712,991 B2
(45) Date of Patent: Aug. 18, 2026

(54) INFORMATION PROCESSING DEVICE AND INFORMATION PROCESSING METHOD

(71) Applicant: SONY GROUP CORPORATION, Tokyo (JP)

(72) Inventor: Masahiro Take, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 170 days.

(21) Appl. No.: 18/703,746

(22) PCT Filed: Oct. 18, 2022

(86) PCT No.: PCT/JP2022/038831
§ 371 (c)(1),
(2) Date: Apr. 23, 2024

(87) PCT Pub. No.: WO2023/074477
PCT Pub. Date: May 4, 2023

(65) Prior Publication Data

US 2025/0233968 A1 Jul. 17, 2025

(30) Foreign Application Priority Data

Nov. 1, 2021 (JP) ................................. 2021-178915

(51) Int. Cl.
*H04N 9/64* (2023.01)

(52) U.S. Cl.
CPC .................................. *H04N 9/643* (2013.01)

(58) Field of Classification Search
CPC ........ H04N 9/643; H04N 1/6033; H04N 9/74; H04N 1/6086; H04N 1/6088; H04N 9/64; G06T 1/00
See application file for complete search history.

(56) References Cited

U.S. PATENT DOCUMENTS

2004/0017379 A1* 1/2004 Ajito .................... H04N 1/6011 345/600
2019/0132568 A1* 5/2019 Ko ....................... H04N 1/6005
2020/0145644 A1 5/2020 Cordes et al.

FOREIGN PATENT DOCUMENTS

JP 11-085952 A 3/1999
JP 2000-341715 A 12/2000
(Continued)

OTHER PUBLICATIONS

English Translation JP-2003134526-A (Year: 2003).*
(Continued)

*Primary Examiner* — Twyler L Haskins
*Assistant Examiner* — John H Morehead, III
(74) *Attorney, Agent, or Firm* — CHIP LAW GROUP

(57) ABSTRACT

Provided is an information processing device that includes a control unit. The control unit converts, based on first conversion information, a first image photographed by a first imaging device in a first space into a display image to be displayed on a display device disposed in a second space. The control unit acquires a second image photographed by a second imaging device to include the display device that displays the display image. The first conversion information is calculated based on an RGB value of a first color image obtained by photographing an image having a predetermined color displayed on the display device with the second imaging device and an RGB value of a second color image obtained by photographing an object having a predetermined color disposed in the second space with the second imaging device.

10 Claims, 14 Drawing Sheets

(56) References Cited

FOREIGN PATENT DOCUMENTS

| | | | | |
|---|---|---|---|---|
| JP | 2001-060082 | A | | 3/2001 |
| JP | 2003134526 | A | * | 5/2003 |
| JP | 2010-521098 | A | | 6/2010 |
| JP | 2011-259047 | A | | 12/2011 |
| JP | 2020-167680 | A | | 10/2020 |
| JP | 2021-056963 | A | | 4/2021 |

OTHER PUBLICATIONS

International Search Report and Written Opinion of PCT Application No. PCT/JP2022/038831, issued on Dec. 20, 2022, 12 pages of ISRWO.

* cited by examiner 400A
300A
S1
BACK-GROUND RGB IMAGE
S2
COORDINATE-CONVERT BACKGROUND RGB IMAGE
BACKGROUND XYZ IMAGE
S3
CONVERT INTO BACKGROUND DISPLAY IMAGE
BACK-GROUND DISPLAY IMAGE
S4
CONVERT INTO DISPLAY IMAGE
S7
COORDINATE-CONVERT CAPTURED RGB IMAGE
CAPTURED XYZ IMAGE
S8
COORDINATE-CONVERT CAPTURED XYZ IMAGE
OUTPUT IMAGE
100
S5
CAPTURED RGB IMAGE
S6
300B
200
600

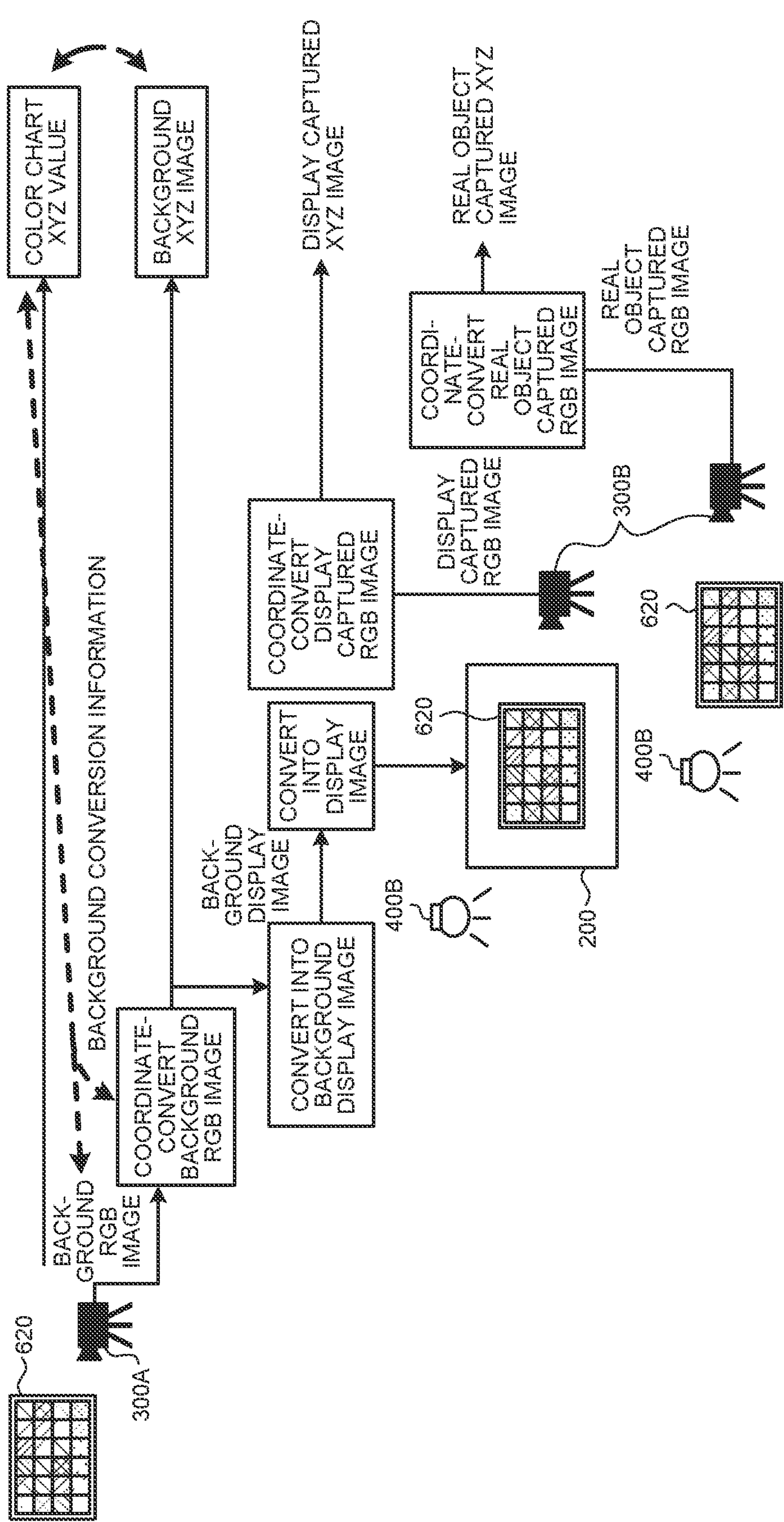
FIG.5A
COLOR CHART XYZ VALUE
BACKGROUND XYZ IMAGE
DISPLAY CAPTURED XYZ IMAGE
REAL OBJECT CAPTURED XYZ IMAGE
BACKGROUND CONVERSION INFORMATION
COORDINATE-CONVERT BACKGROUND RGB IMAGE
BACK-GROUND RGB IMAGE
CONVERT INTO BACKGROUND DISPLAY IMAGE
BACK-GROUND DISPLAY IMAGE
CONVERT INTO DISPLAY IMAGE
COORDINATE-CONVERT DISPLAY CAPTURED RGB IMAGE
DISPLAY CAPTURED RGB IMAGE
COORDI-NATE-CONVERT REAL OBJECT CAPTURED RGB IMAGE
REAL OBJECT CAPTURED RGB IMAGE
400A
620
300A
400B
200
300B

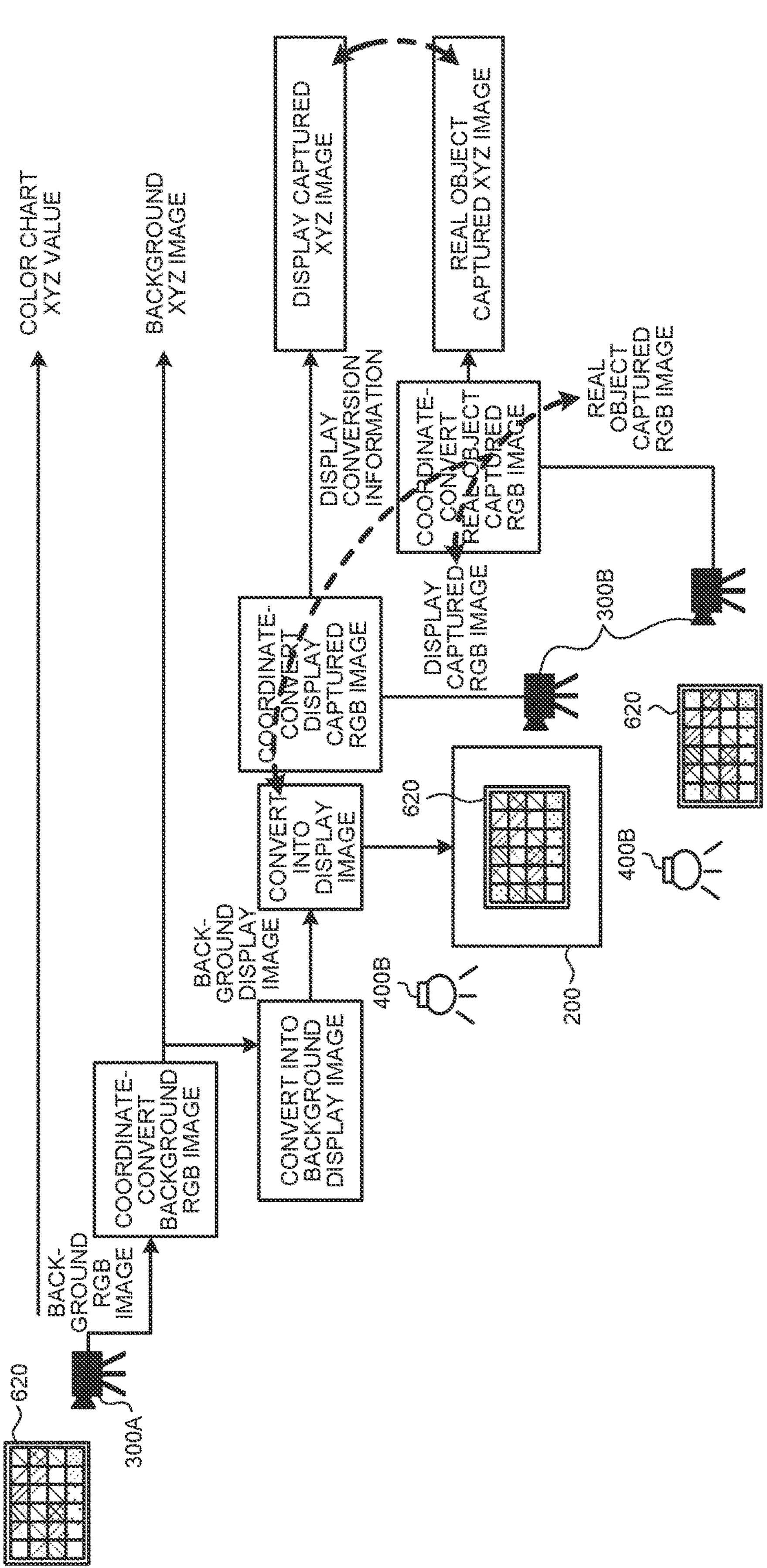
FIG.5B
COLOR CHART XYZ VALUE
BACKGROUND XYZ IMAGE
DISPLAY CAPTURED XYZ IMAGE
REAL OBJECT CAPTURED XYZ IMAGE
DISPLAY CONVERSION INFORMATION
COORDINATE-CONVERT REAL OBJECT CAPTURED RGB IMAGE
REAL OBJECT CAPTURED RGB IMAGE
DISPLAY CAPTURED RGB IMAGE
300B
COORDINATE-CONVERT DISPLAY CAPTURED RGB IMAGE
620
CONVERT INTO DISPLAY IMAGE
BACK-GROUND DISPLAY IMAGE
400B
200
CONVERT INTO BACKGROUND DISPLAY IMAGE
COORDINATE-CONVERT BACKGROUND RGB IMAGE
BACK-GROUND RGB IMAGE
620
300A
400A

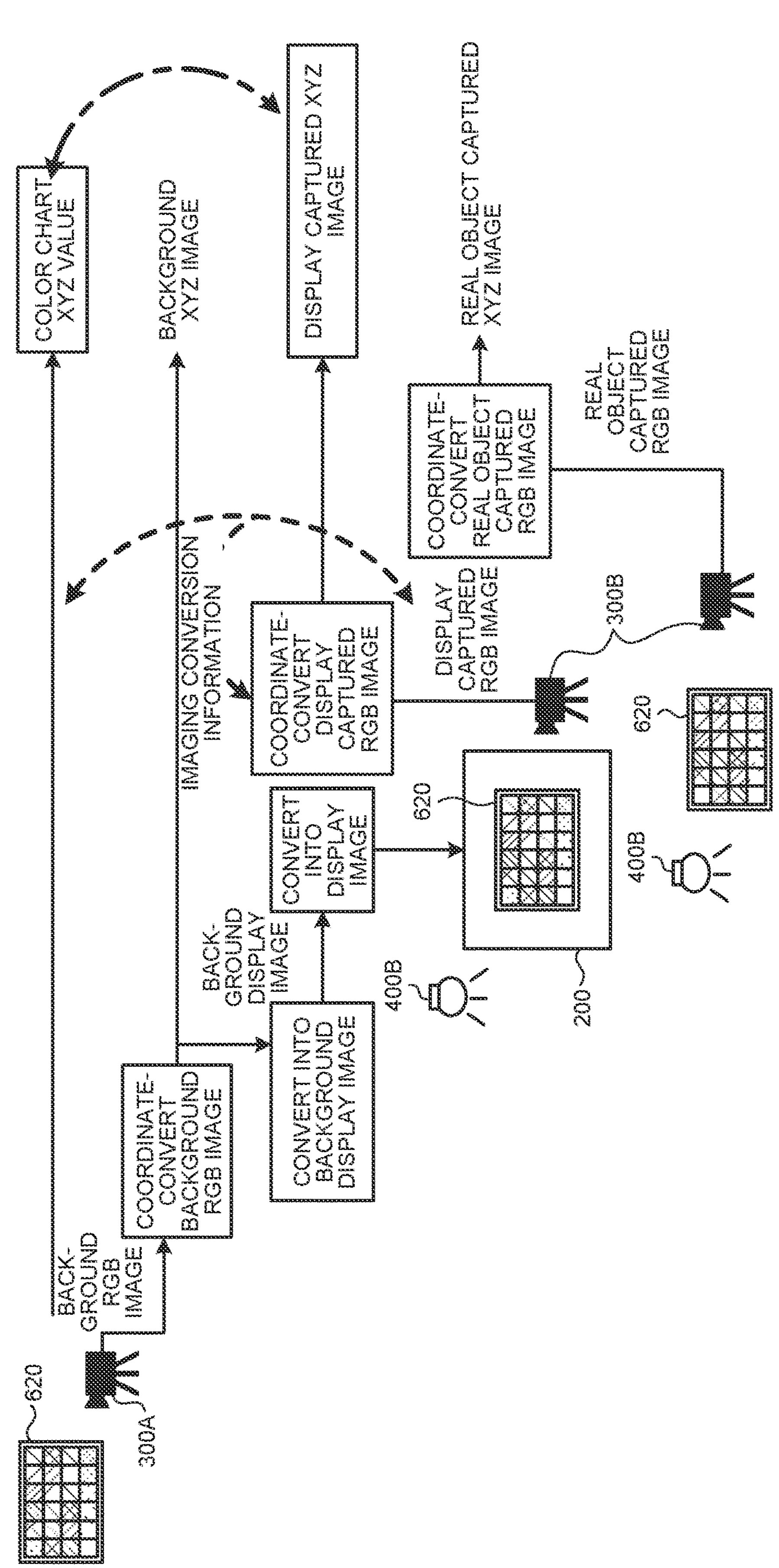
FIG.5C
COLOR CHART XYZ VALUE
BACKGROUND XYZ IMAGE
DISPLAY CAPTURED XYZ IMAGE
REAL OBJECT CAPTURED XYZ IMAGE
COORDINATE-CONVERT REAL OBJECT CAPTURED RGB IMAGE
REAL OBJECT CAPTURED RGB IMAGE
IMAGING CONVERSION INFORMATION
COORDINATE-CONVERT DISPLAY CAPTURED RGB IMAGE
DISPLAY CAPTURED RGB IMAGE
300B
620
CONVERT INTO DISPLAY IMAGE
BACK-GROUND DISPLAY IMAGE
620
400B
200
400B
CONVERT INTO BACKGROUND DISPLAY IMAGE
COORDINATE-CONVERT BACKGROUND RGB IMAGE
BACK-GROUND RGB IMAGE
620
300A
400A

| RGB VALUE | XYZ VALUE |
|---|---|
| 2F1 | 2D3 |
| A8C | 96F |
| ⋮ | |
| F2B | EFC |

100A
OUTPUT IMAGE
S8
COORDINATE-CONVERT CAPTURED XYZ IMAGE
CAPTURED XYZ IMAGE
S7
COORDINATE-CONVERT CAPTURED RGB IMAGE
CAPTURED RGB IMAGE
S6
300B
600
S12
CONVERT INTO DISPLAY IMAGE
S5
DISPLAY RGB IMAGE
S11
COORDINATE-CONVERT BACKGROUND XYZ IMAGE
S2
COORDINATE-CONVERT BACKGROUND RGB IMAGE
BACKGROUND XYZ IMAGE
BACK-GROUND RGB IMAGE
S1
300A
400A
200

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/038831 filed on Oct. 18, 2022, which claims priority benefit of Japanese Patent Application No. JP 2021-178915 filed in the Japan Patent Office on Nov. 1, 2021. Each of the above-referenced applications is hereby incorporated herein by reference in its entirety.

FIELD

The present disclosure relates to an information processing device and an information processing method.

BACKGROUND

In movie photographing and the like, there has been known a photographing system in which a performer performs a performance in front of a wall surface on which an image of computer graphics (CG) or the like is projected and the wall surface and the performer are simultaneously photographed to combine and photograph the CG image and the performer in real time.

CITATION LIST

Patent Literature

Patent Literature 1: US 2020/0145644 A

SUMMARY

Technical Problem

As explained above, when an image projected on a screen (for example, the wall surface) and an object (for example, the performer) are photographed by the same camera, an RGB value of an image obtained by photographing the image again (hereinafter also described as re-photographed image) and an RGB value of an image obtained by photographing the object (hereinafter also referred to as captured image) are sometimes different.

Specifically, for example, it is assumed that the image obtained by photographing the performer is projected on the wall surface and the performer of the same person performs a performance in front of the wall surface (a real space) and photographing is performed. In this case, a color (an RGB value) of a re-photographed image of the performer in the image and a color (an RGB value) of a photographed image of the actual performer in front of the wall surface are sometimes different.

This is because spectral characteristics of the object in the real space and spectral characteristics of the image displayed on the screen are different. Therefore, for example, even if an xy color coordinate of an image and an xy color coordinate of an object in a real space are adjusted to be the same, RGB values obtained when the image and the object are photographed by a camera are not always the same. Therefore, for example, even if the screen and the object in the real space are simultaneously photographed, it cannot be said that an image with high reality (realistic feeling) can be obtained.

Therefore, it is desirable to align the RGB values of the re-photographed image and the RGB values of the photographed image of the real space and photograph an image with higher reality.

Therefore, the present disclosure provides a mechanism that can acquire an image with higher reality.

Note that the problem or the object explained above are merely one of a plurality of problems or objects that can be solved or achieved by a plurality of embodiments disclosed in the present specification.

Solution to Problem

An information processing device of the present disclosure includes a control unit. The control unit converts, based on first conversion information, a first image photographed by a first imaging device in a first space into a display image to be displayed on a display device disposed in a second space. The control unit acquires a second image photographed by a second imaging device to include the display device that displays the display image. The first conversion information is calculated based on an RGB value of a first color image obtained by photographing an image having a predetermined color displayed on the display device with the second imaging device and an RGB value of a second color image obtained by photographing an object having a predetermined color disposed in the second space with the second imaging device.

BRIEF DESCRIPTION OF DRAWINGS

FIG. 5A is a diagram for explaining an example of background conversion information according to the embodiment of the present disclosure.

FIG. 5B is a diagram for explaining an example of display conversion information according to the embodiment of the present disclosure.

FIG. 5C is a diagram for explaining an example of imaging conversion information according to the embodiment of the present disclosure.

DESCRIPTION OF EMBODIMENTS

Figure 1:
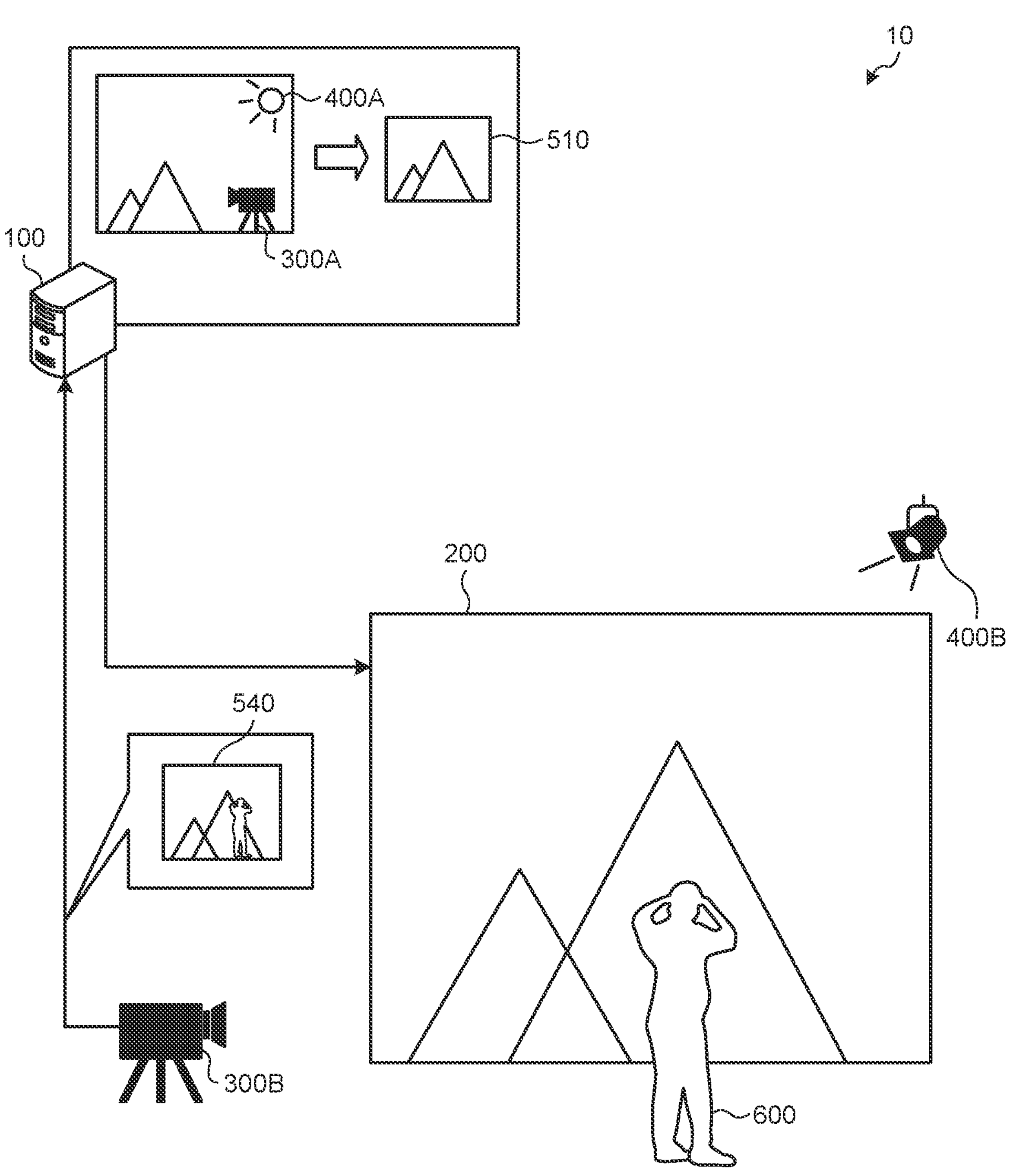
FIG. 1 is a diagram for explaining an overview of an information processing system according to an embodiment of the present disclosure.

An embodiment of the present disclosure is explained in detail below with reference to the accompanying drawings. Note that, in the present specification and the drawings, components having substantially the same functional configurations are denoted by the same reference numerals and signs, whereby redundant explanation of the components is omitted.

In the present specification and the drawings, similar components in the embodiment are sometimes distinguished by adding different alphabets after the same reference numerals. However, when it is unnecessary to particularly distinguish each of the similar components, the same reference numerals are added.

One or a plurality of embodiments (including examples and modifications) explained below can be respectively independently implemented. On the other hand, at least a part of the plurality of embodiments explained below may be implemented in combination with at least a part of other embodiments as appropriate. These plurality of embodiments can include new characteristics different from one another. Therefore, these plurality of embodiments can contribute to solving objects or problems different from one another and can achieve effects different from one another.

1. INTRODUCTION

1.1. Schematic Configuration Example of an Information Processing System

FIG. 1 is a diagram for explaining an overview of an information processing system 10 according to an embodiment of the present disclosure. The information processing system 10 includes an information processing device 100, a display device 200, an imaging device 300, and a light source 400.

The display device 200 is, for example, an LED (Light Emitting Diode) display having the size of an entire wall and is disposed in a real space such as a studio. The display device 200 is also described as LEDwall 200. As illustrated in FIG. 1, in the information processing system 10 according to the embodiment of the present disclosure, a performer 600 performs a performance in front of the display device 200 that displays a video of a three-dimensional virtual space as a background and an imaging device 300B photographs the performance. Consequently, the information processing system 10 can acquire a video as if the performer 600 performed in the three-dimensional virtual space.

Here, in the embodiment of the present disclosure, the information processing device 100 generates a background image to be displayed on the LEDwall 200. In the example illustrated in FIG. 1, the information processing device 100 generates a background image 510 photographed by a virtual imaging device 300A under a virtual light source 400A (here, for example, sunlight) in a three-dimensional virtual space.

The imaging device 300A is, for example, a device that images a subject in a three-dimensional virtual space. The imaging device 300A is, for example, an RGB camera that photographs a background image 510 of an RGB value. Note that, here, the imaging device 300A is assumed to be a virtual RGB camera that images a subject in a three-dimensional virtual space but is not limited thereto. For example, the imaging device 300A may be an RGB camera that images a subject in the real space. The real space in which the imaging device 300A performs photographing can be a space different from a real space in which the LEDwall 200 is disposed, that is, a real space in which the imaging device 300B performs photographing.

The information processing device 100 converts the generated background image 510 into an image (a display image) for displaying on the LEDwall 200 and displays the display image on the LEDwall 200.

The imaging device 300B is disposed in the same real space as the real space in which the LEDwall 200 is disposed. The imaging device 300B acquires a captured image 540 by simultaneously photographing the display image displayed on the LEDwall 200 and the performer 600. The imaging device 300B is, for example, an RGB camera that photographs the captured image 540 of an RGB value.

Note that, in the example illustrated in FIG. 1, the imaging device 300B photographs the captured image 540 under a light source 400B such as an LED. The imaging device 300B outputs the captured image 540 to the information processing device 100.

Note that, in FIG. 1, a case in which the display device 200 is an LEDwall on the entire wall surface is illustrated. However, the display device 200 is not limited thereto. For example, the display device 200 may include a plurality of LEDwalls. Alternatively, the display device 200 may be a device that displays the background image 510 on a wall surface and a ceiling (or a floor surface). Alternatively, the display device 200 may be a device having a predetermined size such as the same size as a person in the real space. That is, the background image displayed by the display device 200 can include an image of an object such as a person in addition to an image of a background such as a landscape.

Here, the display device 200 is an LED display but is not limited thereto. For example, the display device 200 may be an LCD (Liquid Crystal Display).

1.2. Problems of the Related Art

Here, in the information processing system 10, colors (RGB values) of a photographed image obtained by photographing a display image displayed on the LEDwall 200 with the imaging device 300B and a photographed image obtained by photographing an object in the real space are sometimes different. This point is explained with reference to FIG. 2 and FIG. 3. Note that, in the following explanation, the photographed image obtained by photographing the display image displayed on the LEDwall 200 with the imaging device 300B is also referred to as display photographed image. A photographed image obtained by photographing an object in the real space is also referred to as real object photographed image.

Figure 2:
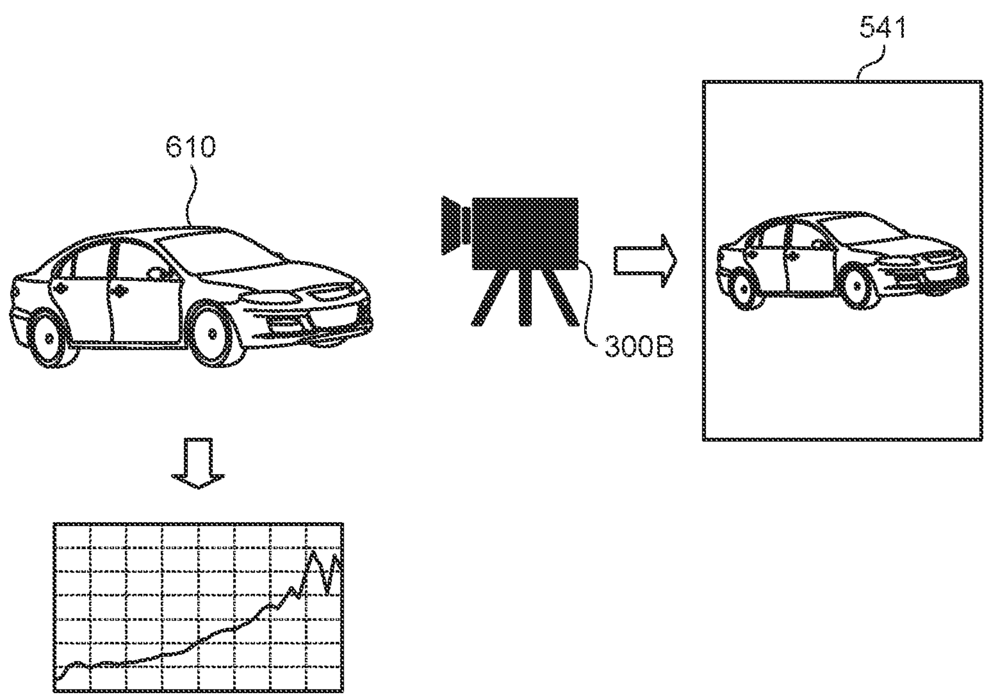
FIG. 2 is a diagram for explaining an example of a real object photographed image according to the embodiment of the present disclosure.

FIG. 2 is a diagram for explaining an example of a real object photographed image according to the embodiment of the present disclosure. As illustrated in FIG. 2, the imaging device 300B images an object 610 (an automobile in an example illustrated FIG. 2) disposed in the real space and generates a real object captured image 541.

Here, spectral characteristics of the object 610 is determined by spectral characteristics of a light source in the real space and the spectral reflectance of the object 610. As illustrated in a graph of FIG. 2, the distribution of the spectral characteristics of the object 610 disposed in the real space is, for example, a gentle distribution.

Figure 3:
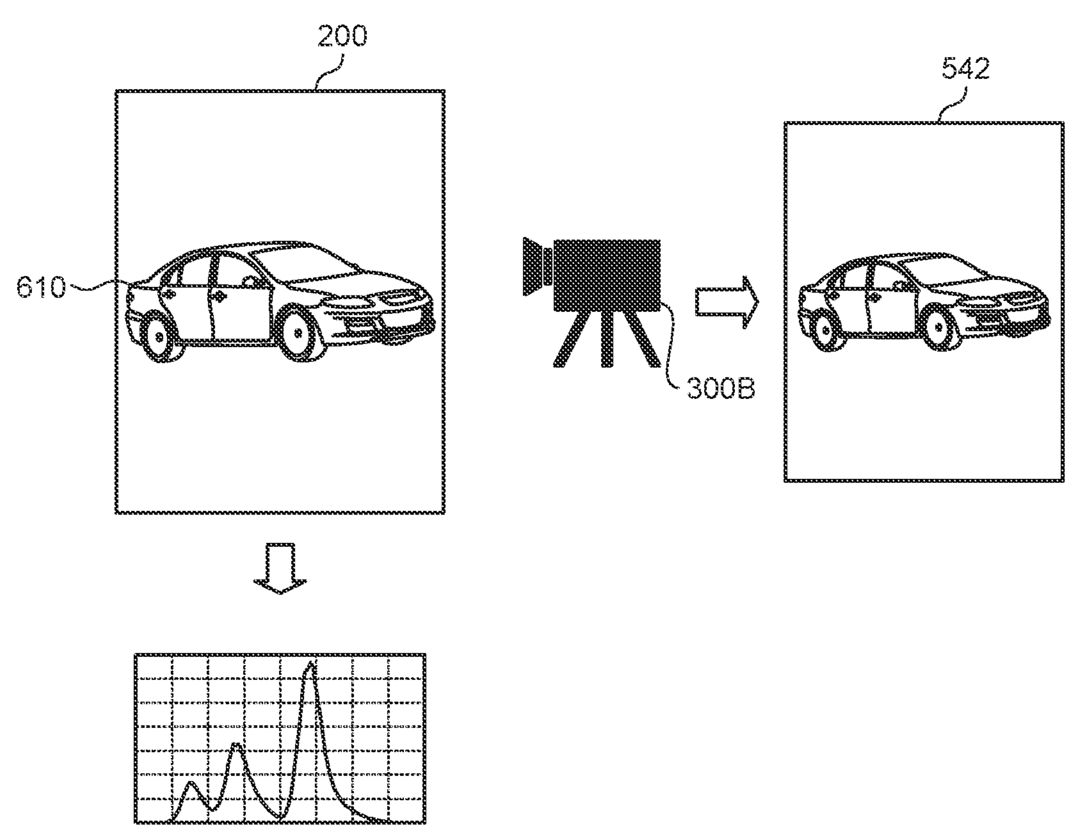
FIG. 3 is a diagram for explaining an example of a display photographed image according to the embodiment of the present disclosure.

FIG. 3 is a diagram for explaining an example of a display photographed image according to the embodiment of the present disclosure. As illustrated in FIG. 3, the imaging device 300B images the object 610 displayed on the LEDwall 200 disposed in the real space and generates a display captured image 542. Note that it is assumed that the object 610 displayed on the LEDwall 200 is the same object as the object 610 (see FIG. 2) disposed in the real space.

At this time, even though the imaging device 300B photographs the same object 610, the RGB values of the real object captured image 541 and the RGB values of the display captured image 542 are sometimes different values.

This is because the spectral characteristics of the object 610 disposed in the real space and the spectral characteristics of the object 610 displayed on the LEDwall 200 are different.

Here, the display image displayed on the LEDwall 200 is, for example, an image captured by the imaging device 300A. Therefore, the spectral characteristics of the object 610 displayed on the LEDwall 200 are characteristics corresponding to the spectral characteristics of the imaging device 300A and the LEDwall 200. For example, as illustrated in a graph of FIG. 3, the distribution of the spectral characteristics of the object 610 displayed on the LEDwall 200 is a distribution having peaks near wavelengths of R (Red), G (Green), and B (Blue).

As explained above, the spectral distribution of the object 610 disposed in the real space and the spectral distribution of the object 610 displayed on the LEDwall 200 are different. Therefore, when the same object 610 is imaged by the imaging device 300B, the RGB values of the real object captured image 541 and the RGB values of the display captured image 542 are different values.

For example, even if xy color coordinates are adjusted such that XYZ values of the real object captured image 541 and the display captured image 542 are the same, the RGB values of the real object captured image 541 and the display captured image 542 are not the same values, although the captured images are a condition equal color pair.

Here, the condition equal color pair means that, when colors of two objects are measured with a colorimeter, measurement results sometimes indicate the same color even if the spectral characteristics of the two objects are different. As explained above, the spectral characteristics of the object 610 in the real space and the spectral characteristics of the object 610 displayed on the LEDwall 200 are different. Therefore, for example, by adjusting the xy color coordinate of the object 610 displayed on the LEDwall 200, the hues of the object 610 in the real space and the object 610 displayed on the LEDwall 200 can be aligned when viewed from a human present in the real space.

However, the spectral characteristics of the imaging device 300B are different from the spectral characteristics of human eyes. Therefore, even if the hues of the object 610 in the real space and the object 610 displayed on the LEDwall 200 are the same when viewed from a person present in the real space, the hues of the real object captured image 541 and the display captured image 542 photographed by the imaging device 300B are different.

As explained above, when the display image displayed on the display device 200 is photographed again by the imaging device 300B, there is a problem in that the hue of the display captured image 542 obtained by photographing the display image and the hue of the real object captured image 541 obtained by imaging the object 610 in the real space are different.

Therefore, even if the display image and the object 610 in the real space are simultaneously photographed, the hue of the display image and the hue of the object 610 in the real space are different. It is likely that a realistic photographed image cannot be obtained.

1.3. Overview of Information Processing

Therefore, in the proposed technology of the present disclosure, the information processing device 100 converts the background image 510 captured by the imaging device 300A into a display image to be displayed on the LEDwall 200 using the display conversion information. Here, the display conversion information is information calculated based on the RGB value of the display captured image 542 obtained by photographing the display image and the RGB value of the real object captured image 541 obtained by imaging the object 610 in the real space. For example, the display conversion information is a conversion coefficient for aligning the RGB value of the display captured image 542 obtained by photographing the display image and the RGB value of the real object captured image 541 obtained by imaging the object 610 in the real space.

For example, the information processing device 100 converts the an RGB value of a background image (an example of a first image) photographed by the imaging device 300A (an example of a first imaging device) in a three-dimensional virtual space (an example of a first space) into an XYZ value based on imaging conversion information (an example of second conversion information).

The information processing device 100 converts the background image having the XYZ value into a display image to be displayed on the display device 200 disposed in the real space (an example of a second space) based on the display conversion information (an example of first conversion information).

The information processing device 100 acquires the captured image 540 (an example of a second image) photographed by the imaging device 300B (an example of a second imaging device) to include the display device 200 that displays a display image.

The information processing device 100 converts an RGB value of the captured image 540 into an XYZ value based on the imaging conversion information (an example of third conversion information) and acquires a third image. The information processing device 100 generates an output image by converting the XYZ value of the third image into an RGB value.

Here, the display conversion information is calculated based on an RGB value of a first color image and an RGB value of a second color image. The first color image is, for example, the display captured image 542 obtained by photographing an image having a predetermined color displayed on the display device 200 with the imaging device 300B. The second color image is, for example, the real object captured image 541 obtained by photographing an object having a predetermined color disposed in the real space with the imaging device 300B.

For example, the information processing device 100 calculates display conversion information for aligning (making substantially the same) the RGB value of the first color image and the RGB value of the second color image.

Consequently, the information processing device 100 can align the hue of the display captured image 542 obtained by photographing the display image and the hue of the real object captured image 541 obtained by imaging the object 610 in the real space and can acquire a captured image with more reality.

Note that, here, a case in which the information processing system 10 is applied to photographing of a movie, a drama, or the like is explained as an application example of the information processing system 10. However, an application example is not limited thereto. For example, the information processing system 10 according to the embodiment of the present disclosure can be applied to various systems that re-photograph a video displayed on the display device 200 such as photographing of a TV program in which a commentator appears across a liquid crystal display.

Figure 4:
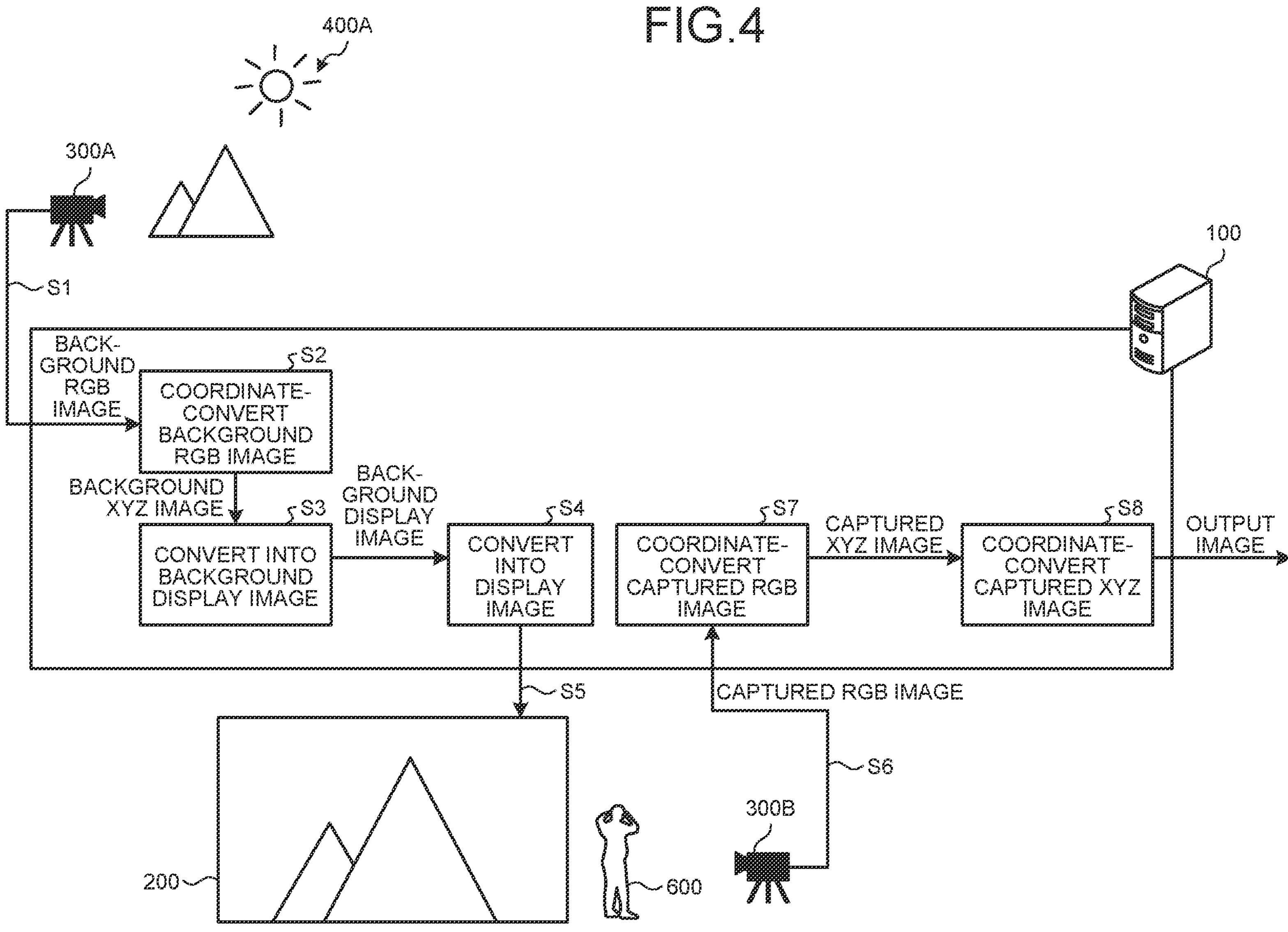
FIG. 4 is a diagram for explaining an overview of photographing processing according to the embodiment of the present disclosure.

FIG. 4 is a diagram for explaining an overview of photographing processing according to the embodiment of the present disclosure. Such photographing processing is, for example, processing for photographing a display image displayed on the LEDwall 200 and a subject (for example, the performer 600) disposed in the real space and generating an output image. The imaging processing is performed by the information processing device 100.

For example, the information processing device 100 acquires a background image having an RGB value (hereinafter also referred to as background RGB image) photographed by the virtual imaging device 300A under the virtual light source 400A in the virtual space (Step S1).

The information processing device 100 performs coordinate conversion of the acquired background RGB image into an XYZ value using background conversion information (an example of first conversion information) and generates a background image having the XYZ value (hereinafter also referred to as background XYZ image) (Step S2).

The information processing device 100 converts the generated background XYZ image into a background display image 520 having an RGB value (an example of a fourth image) in order to display the background XYZ image on the LEDwall 200 (Step S3). The information processing device 100 converts the background display image 520 into a display image having an RGB value using the display conversion information (an example of the second conversion information) (Step S4). The information processing device 100 displays the display image on the LEDwall 200 (Step S5).

The information processing device 100 acquires a captured image having an RGB value (hereinafter also referred to as captured RGB image) photographed by the imaging device 300B (Step S6). The captured RGB image is an image including a display image displayed on the LEDwall 200 and the performer 600.

The information processing device 100 performs coordinate conversion for converting the acquired captured RGB image into an XYZ value using the imaging conversion information (an example of third conversion information) and generates a captured image having the XYZ value (hereinafter also referred to as captured XYZ image) (Step S7).

The information processing device 100 converts the captured XYZ image into an output image having an RGB value (Step S8).

Here, the background conversion information, the display conversion information, and the imaging conversion information are explained with reference to FIGS. 5A, 5B, 5C, and FIG. 5A is a diagram for explaining an example of the background conversion information according to the embodiment of the present disclosure.

As illustrated in FIG. 5A, the background conversion information is calculated based on the background RGB image (an example of an RGB value of a third color image) and an XYZ value (a color chart XYZ value) of a color chart 620. The background RGB image is an image obtained by photographing the color chart 620 (an example of an object having a predetermined color) with the imaging device 300A in the three-dimensional virtual space. As illustrated in FIG. 5A, the color chart 620 includes a plurality of sample colors.

For example, the information processing device 100 calculates background conversion information for associating an RGB value for each of the sample colors of the background RGB image with an XYZ value for each of the sample colors of the color chart.

As explained above, the information processing device 100 uses the background conversion information when coordinate-converting the background RGB image into a background XYZ image. Consequently, the information processing device 100 can match the XYZ value of the background XYZ image to the XYZ value of the color chart 620 disposed in the three-dimensional virtual space.

FIG. 5B is a diagram for explaining an example of the display conversion information according to the embodiment of the present disclosure.

As illustrated in FIG. 5B, the display conversion information is calculated based on a real object captured RGB image (an example of a second color image) and a display captured RGB image (an example of a first color image).

Note that the real object captured RGB image is a captured RGB image obtained by imaging the color chart 620 disposed in the real space with the imaging device 300. The display captured RGB image is a captured RGB image obtained by imaging the image of the color chart 620 displayed on the display device 200 with the imaging device 300B.

Here, the color chart 620 disposed in the real space and the color chart 620 disposed in the three-dimensional virtual space explained above are desirably the same. In other words, it is desirable that the spectral reflectance of the color chart 620 disposed in the real space and the spectral reflectance of the color chart 620 disposed in the three-dimensional virtual space explained above are the same. As the spectral reflectance of the color chart 620 disposed in the real space and the spectral reflectance of the color chart 620 disposed in the three-dimensional virtual space explained above are closer, the accuracy of the background conversion information, the display conversion information, and the imaging conversion information is improved.

The information processing device 100 converts the background RGB image explained above into a background XYZ image using the background conversion information. The information processing device 100 converts the background XYZ image into a background display image having an RGB value in order to display the background XYZ image on the LEDwall 200. The information processing device 100 acquires a display captured RGB image by causing the imaging device 300B to photograph the LEDwall 200 in a state in which the background display image is displayed on the LEDwall 200, thereby acquiring the display captured RGB image.

For example, the information processing device 100 calculates display conversion information for associating an RGB value for each of sample colors of the display captured RGB image with an RGB value for each of sample colors of the real object captured RGB image.

As explained above, the information processing device 100 uses the display conversion information when converting the background display image into the display image. Consequently, the information processing device 100 can match the RGB value for each of the sample colors of the display captured RGB image to the RGB value for each of the sample colors of the real object captured RGB image. In other words, the information processing device 100 can match an XYZ values for each of the sample colors of the display captured XYZ image to an XYZ value for each of the sample colors of the real object captured XYZ image.

FIG. 5C is a diagram for explaining an example of the imaging conversion information according to the embodiment of the present disclosure.

As illustrated in FIG. 5C, the imaging conversion information is calculated based on the display captured RGB image and an XYZ value of the color chart 620 disposed in the three-dimensional virtual space. Note that the display captured RGB image is an image captured by the imaging device 300B in a state in which the background display image is converted into a display image using the display conversion information and the display image is displayed on the LEDwall 200.

For example, the information processing device 100 calculates imaging conversion information that associates the RGB value for each of the sample colors of the display captured RGB image with the XYZ value for each of the sample colors of the color chart disposed in the three-dimensional virtual space.

As explained above, the information processing device 100 uses the imaging conversion information when converting the display captured RGB image into a display captured XYZ image. Consequently, the information processing device 100 can match the XYZ value for each of the sample colors of the display captured XYZ image to the XYZ value of the color chart 620 disposed in the three-dimensional virtual space.

As explained above, by converting the background display image into the display image using the display conversion information, the information processing device 100 can match the RGB value for each of the sample colors of the display captured RGB image to the RGB value for each of the sample colors of the real object captured RGB image.

Figure 5D:
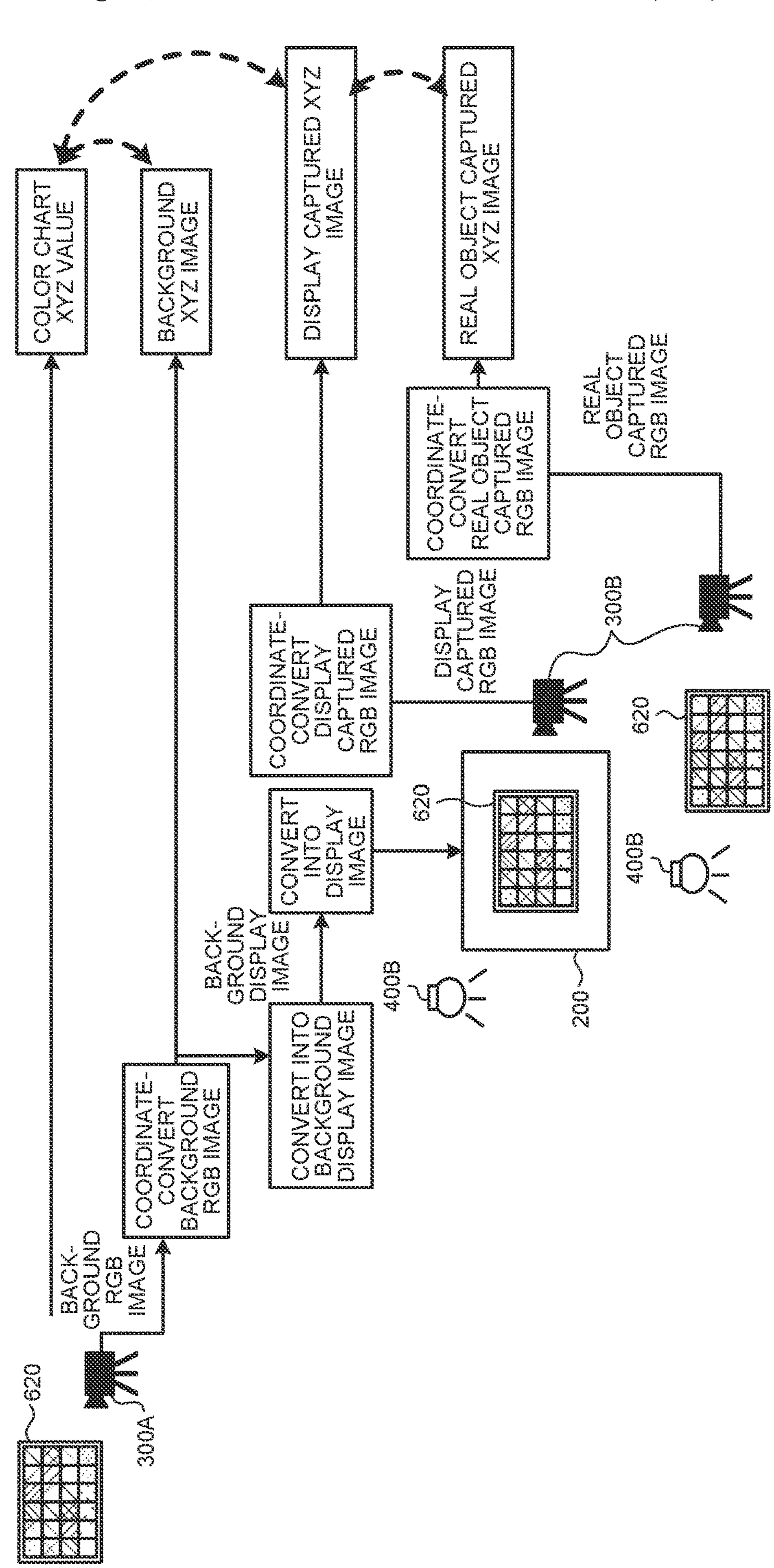
FIG. 5D is a diagram for explaining an example of pieces of conversion information according to the embodiment of the present disclosure.

FIG. 5D is a diagram for explaining an example of pieces of conversion information according to the embodiment of the present disclosure. As illustrated in FIG. 5D, the information processing device 100 calculates background conversion information such that an XYZ values of the background XYZ image is closer to the XYZ value of the color chart 620 disposed in the three-dimensional virtual space. The information processing device 100 calculates display conversion information such that an XYZ value for each of sample colors of the display-captured XYZ image is closer to the XYZ value for each of sample colors of the real object captured XYZ image. The information processing device 100 calculates imaging conversion information such that an XYZ value for each of sample colors of the display captured XYZ image is closer to the XYZ value for each of colors of the color chart 620.

Consequently, the information processing device 100 can match the XYZ value of the color chart 620, and the values for each of sample colors of the background XYZ image, the display captured XYZ image, and the real object captured XYZ image. Therefore, the information processing device 100 can match hues at the time when the display captured XYZ image and the real object captured XYZ image are coordinate-converted into RGB values and can acquire a realistic output image.

Note that, here, matching the XYZ values does not necessarily mean that the XYZ values coincide. A certain degree of deviation (for example, deviation that cannot be visually recognized by a human) can be allowed. The same applies to a case in which RGB values are matched or a case in which RGB values (or XYZ values) are aligned (set substantially the same). Note that such deviation can be expressed as an error at the time of coordinate conversion. How much deviation (error) is allowed is determined according to an application destination or the like of the information processing system 10.

2. CONFIGURATION EXAMPLE OF THE INFORMATION PROCESSING DEVICE

Figure 6:
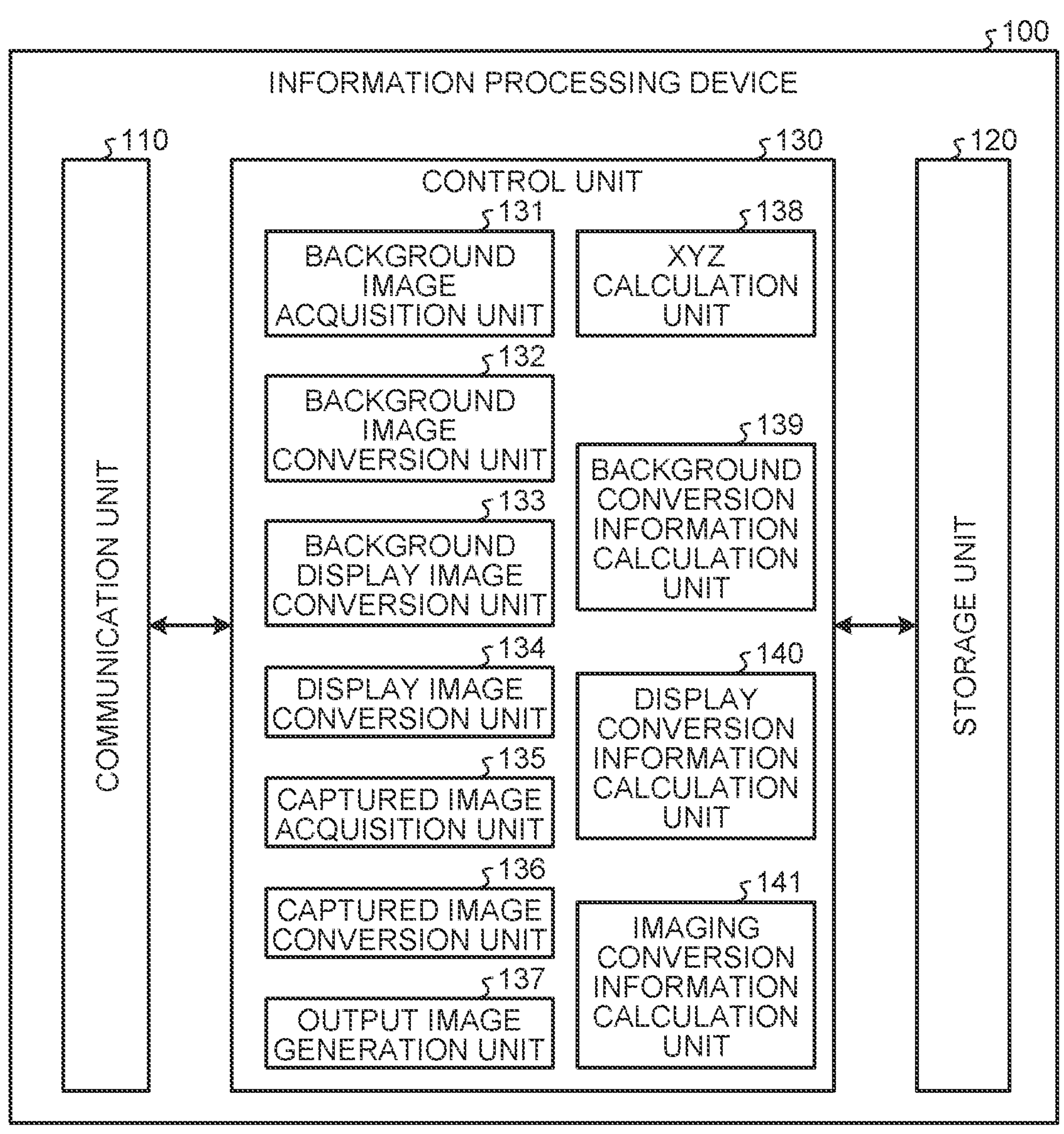
FIG. 6 is a block diagram illustrating a configuration example of an information processing device according to the embodiment of the present disclosure.

Next, a configuration example of the information processing device 100 according to a first embodiment of the present disclosure is explained. FIG. 6 is a block diagram illustrating a configuration example of the information processing device 100 according to the embodiment of the present disclosure. As illustrated in FIG. 6, the information processing device 100 includes a communication unit 110, a storage unit 120, and a control unit 130.

[Communication Unit 110]

The communication unit 110 is a communication interface that communicates with an external device via a network by wire or radio. The communication unit 110 is implemented by, for example, an NIC (Network Interface Card).

[Storage Unit 120]

The storage unit 120 is a data readable/writable storage device such as a DRAM, an SRAM, a flash memory, or a hard disk. The storage unit 120 functions as storage means of the information processing device 100.

[Control Unit 130]

The control unit 130 controls the units of the information processing device 100. The control unit 130 is realized by, for example, a program stored inside the information processing device 100 being executed by a CPU (Central Processing Unit), an MPU (Micro Processing Unit), a GPU (Graphics Processing Unit), or the like using a RAM (Random Access Memory) or the like as a work area. The control unit 130 is implemented by an integrated circuit such as an ASIC (Application Specific Integrated Circuit) or an FPGA (Field Programmable Gate Array).

The control unit 130 includes a background image acquisition unit 131, a background image conversion unit 132, a background display image conversion unit 133, a display image conversion unit 134, a captured image acquisition unit 135, a captured image conversion unit 136, and an output image generation unit 137. The control unit 130 includes an XYZ calculation unit 138, a background conversion information calculation unit 139, a display conversion information calculation unit 140, and an imaging conversion information calculation unit 141. Blocks (the background image acquisition unit 131 to the imaging conversion information calculation unit 141) configuring the control unit 130 are functional blocks indicating functions of the control unit 130. These functional blocks may be software blocks or may be hardware blocks. For example, each of the functional blocks explained above may be one software module implemented by software (including a micro program) or may be one circuit block on a semiconductor chip (die). Naturally, each of the functional blocks may be one processor or one integrated circuit. The control unit 130 may be configured in functional units different from the functional blocks explained above. A configuration method for the functional blocks is optional.

Note that the control unit 130 may be configured in functional units different from the functional blocks explained above. Another device may perform operations of a part or all of the blocks (the background image acquisition unit 131 to the imaging conversion information calculation unit 141) configuring the control unit 130. For example, a control device realized by cloud computing may perform a part or all of the operations of the blocks configuring the control unit 130.

(Background Image Acquisition Unit 131)

The background image acquisition unit 131 acquires a background RGB image to be displayed on the LEDwall 200. The background image acquisition unit 131 generates, as a background RGB image, an image photographed by the virtual imaging device 300A disposed in the three-dimensional virtual space.

Alternatively, the background image acquisition unit 131 may acquire a background RGB image stored in the storage unit 120. The background image acquisition unit 131 can acquire the background RGB image from an external information processing device or the like instead of the storage unit 120. When the background RGB image is an image photographed in a real space such as a remote place, the background image acquisition unit 131 can acquire the background RGB image from the imaging device 300A disposed in the remote place.

The background image acquisition unit 131 outputs the acquired background RGB image to the background image conversion unit 132. When the background RGB image is an image obtained by photographing an object having a predetermined color (for example, the color chart 620), the background image acquisition unit 131 outputs the background RGB image to the background conversion information calculation unit 139.

(Background Image Conversion Unit 132)

The background image conversion unit 132 executes conversion processing for converting the background RGB image acquired from the background image acquisition unit 131 into a background XYZ image having a color absolute coordinate XYZ value using the background conversion information. The background image conversion unit 132 outputs the background XYZ image to the background display image conversion unit 133. Note that details of the conversion processing are explained below.

(Background Display Image Conversion Unit 133)

The background display image conversion unit 133 converts the background XYZ image acquired from the background image conversion unit 132 into a background display image having an RGB value in order to display the background XYZ image on the LEDwall 200. Note that information for converting the background XYZ image into the background display image of having the RGB value is assumed to be stored in the storage unit 120 in advance.

The background display image conversion unit 133 outputs the background display image to the display image conversion unit 134. When the background display image includes an object having a predetermined color (for example, the color chart 620), the background display image conversion unit 133 causes the LEDwall 200 to display the background display image.

(Display Image Conversion Unit 134)

The display image conversion unit 134 executes conversion processing for converting the background display image acquired from the background display image conversion unit 133 into a display image using the display conversion information. The display image conversion unit 134 causes the LEDwall 200 to display the display image. Note that details of the conversion processing are explained below.

(Captured Image Acquisition Unit 135)

The captured image acquisition unit 135 acquires a captured RGB image photographed by the imaging device 300B disposed in the real space. The captured image acquisition unit 135 acquires, for example, a captured RGB image obtained by re-photographing a display image displayed on the LEDwall 200. The captured image acquisition unit 135 acquires a captured RGB image obtained by photographing a subject in the real space. The captured image acquisition unit 135 acquires a captured RGB image obtained by simultaneously photographing both of the display image displayed on the LEDwall 200 and the subject in the real space.

The captured image acquisition unit 135 outputs the acquired captured RGB image to the captured image conversion unit 136. Furthermore, when the captured RGB image is a display captured RGB image obtained by photographing an object having a predetermined color (for example, the color chart 620) displayed on the LEDwall 200, the captured image acquisition unit 135 outputs the captured RGB image to the display conversion information calculation unit 140. When the captured RGB image is a real object captured RGB image obtained by photographing an object having a predetermined color (for example, the color chart 620) disposed in the real space, the captured image acquisition unit 135 outputs the captured RGB image to the display conversion information calculation unit 140.

(Captured Image Conversion Unit 136)

The captured image conversion unit 136 executes conversion processing for converting the captured RGB image acquired from the captured image acquisition unit 135 into a captured XYZ image having a color absolute coordinate XYZ value using imaging conversion information. The captured image conversion unit 136 outputs the captured XYZ image to the output image generation unit 137. Note that details of the conversion processing are explained below.

(Output Image Generation Unit 137)

The output image generation unit 137 converts the captured XYZ image acquired from the captured image conversion unit 136 into an output image having an RGB value. Note that information for converting the captured XYZ image into an output image having an RGB value is assumed to be stored in the storage unit 120 in advance.

(XYZ Calculation Unit 138)

The XYZ calculation unit 138 calculates an XYZ value of a predetermined color (a sample color) of an object having the predetermined color (for example, the color chart 620) disposed in the three-dimensional virtual space. The XYZ calculation unit 138 calculates the XYZ value of the sample color based on the spectral characteristics of the light source 400A in the three-dimensional virtual space and the spectral reflectance of the sample color. Alternatively, the XYZ calculation unit 138 may acquire the XYZ value of the predetermined color by imaging the object having the predetermined color with an XYZ camera. Note that the XYZ camera is, for example, an imaging device imitating the spectral characteristics of human eyes and is a device that generates a captured image having an XYZ value.

The object sometimes includes a plurality of sample colors. For example, the color chart 620 includes twenty-four sample colors (see FIG. 5A). In this case, the XYZ calculation unit 138 acquires an XYZ value for each of the plurality of sample colors. Note that the number of sample colors is not limited to twenty-four and may be less than twenty-four or may be twenty-five or more. The information processing device 100 can reduce errors in the conversion processing as the number of sample colors is larger.

The XYZ calculation unit 138 outputs the acquired XYZ value of the color chart 620 to the background conversion information calculation unit 139.

(Background Conversion Information Calculation Unit 139)

The background conversion information calculation unit 139 calculates background conversion information using the background RGB image acquired from the background image acquisition unit 131 and the XYZ value of the color chart 620 acquired from the XYZ calculation unit 138. The background conversion information is, for example, information for associating an RGB value of the background RGB image with an XYZ value of the color chart 620 for each of the sample colors included in the color chart 620. Details of the background conversion information and calculation processing for the background conversion information are explained below.

The background conversion information calculation unit 139 outputs the calculated background conversion information to the background image conversion unit 132.

(Display Conversion Information Calculation Unit 140)

The display conversion information calculation unit 140 calculates display conversion information using the display captured RGB image acquired from the captured image acquisition unit 135 and the real object captured RGB image acquired from the captured image acquisition unit 135. The display conversion information is, for example, information for associating an RGB value of the display captured RGB image and an RGB value of the real object captured RGB image for each of the sample colors included in the color chart 620. Details of the display conversion information and calculation processing for the display conversion information are explained below.

The display conversion information calculation unit 140 outputs the calculated display conversion information to the display image conversion unit 134.

(Imaging Conversion Information Calculation Unit 141)

The imaging conversion information calculation unit 141 calculates imaging conversion information using the display captured RGB image acquired from the captured image acquisition unit 135 and the XYZ value of the color chart 620 acquired from the XYZ calculation unit 138. The imaging conversion information is, for example, information for associating an RGB value of the display captured RGB image and an XYZ value of the color chart 620 for each of the sample colors included in the color chart 620. Details of the imaging conversion information and calculation processing for the imaging conversion information are explained below.

The imaging conversion information calculation unit 141 outputs the calculated imaging conversion information to the captured image conversion unit 136.

Example of Conversion Information

Here, an example of the background conversion information, the display conversion information, and the imaging conversion information explained above (hereinafter also collectively referred to as conversion information) is explained. The background conversion information is explained as an example of the conversion information below. However, the display conversion information and the imaging conversion information are the same.

(Background Conversion Coefficient)

Figures 7, 8:
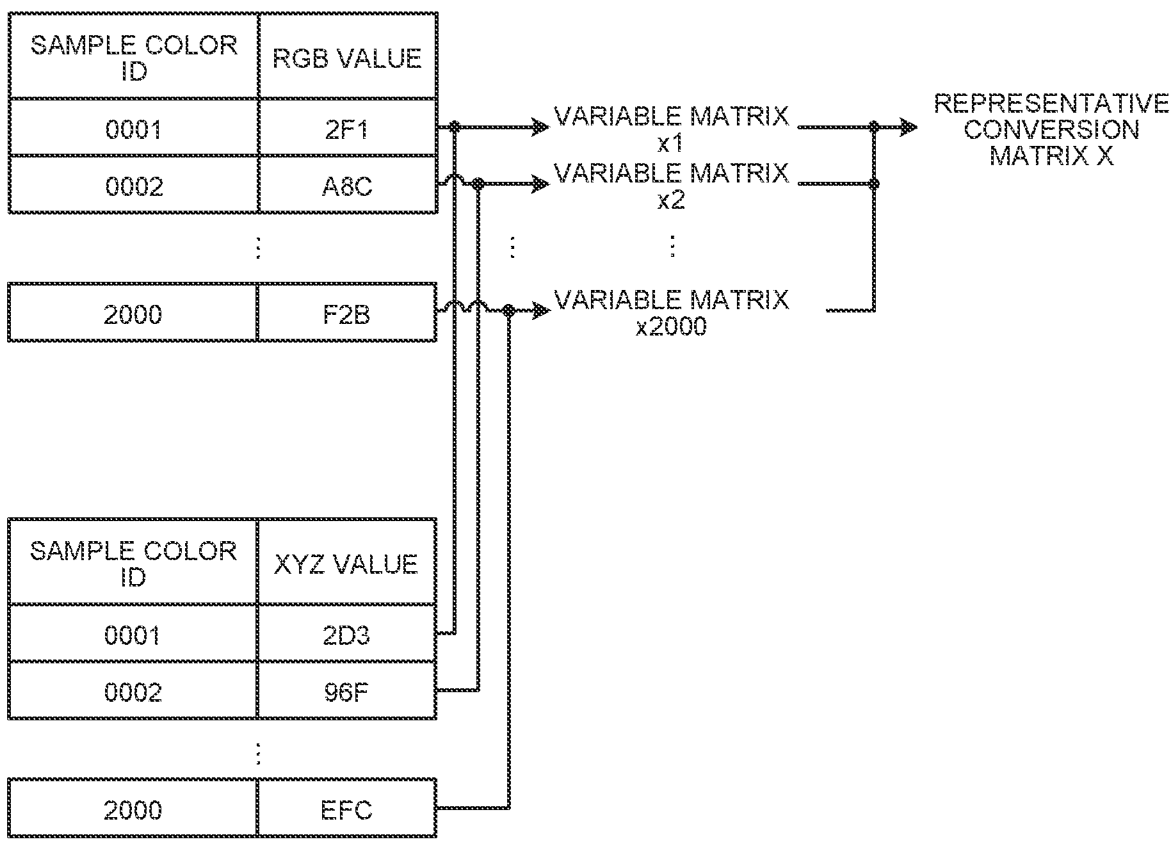
FIG. 7 is a diagram for explaining an example of background conversion information according to the embodiment of the present disclosure.
FIG. 8 is a diagram illustrating an example of background conversion information calculated by a background conversion information calculation unit according to the embodiment of the present disclosure.

FIG. 7 is a diagram for explaining an example of the background conversion information according to the embodiment of the present disclosure. As explained above, the conversion information is calculated in the background conversion information calculation unit 139 (see FIG. 6).

In the example illustrated in FIG. 7, the background conversion information calculation unit 139 compares the background RGB image acquired from the background image acquisition unit 131 with the XYZ value of the color chart 620 acquired from the XYZ calculation unit 138 to mathematically calculate a color coordinate conversion coefficient as the conversion information. For example, the background conversion information calculation unit 139 calculates a background conversion coefficient using a regression analysis.

As explained above, a background RGB image includes an RGB value for each of sample colors. In FIG. 7, a sample color ID for identifying a sample color and a four-bit RGB value are illustrated in association with each other. In FIG. 7, a sample color ID for identifying a sample color and a four-bit XYZ value are illustrated in association with each other.

The background conversion information calculation unit 139 compares an RGB value and an XYZ value having the same sample color ID and calculates a background conversion coefficient for converting the RGB value into the XYZ value. For example, when conversion from the RGB value into the XYZ value is performed by matrix operation, a conversion matrix for converting the RGB value into the XYZ value is calculated.

For example, in the example illustrated in FIG. 7, the background conversion information calculation unit 139 calculates a conversion matrix x1 for converting an RGB value "2F1" with a sample color ID of "0001" into an XYZ value "2D3". The conversion matrix x1 is, for example, a 3×3 matrix.

Similarly, the background conversion information calculation unit 139 calculates conversion matrices x2 to x2000 corresponding to sample color IDs "0002" to "2000". As explained above, the background conversion information calculation unit 139 calculates, for example, conversion matrices x corresponding to all sample colors included in the color sample (a color specimen).

The conversion matrix x calculated by the background conversion information calculation unit 139 is different for each of the sample colors. Therefore, the background conversion information calculation unit 139 calculates, as background conversion information, a representative conversion matrix X that can express the conversion from RGB values to XYZ values in average in all the sample colors using, for example, the least squares method and outputs the representative conversion matrix X to the background image conversion unit 132. Consequently, the background image conversion unit 132 can convert a background RGB image into a background XYZ image with simple matrix operation and can reduce an operation amount of the conversion processing.

On the other hand, when all the colors are converted by one representative conversion matrix X, conversion accuracy varies depending on the colors. As a method of suppressing such variation, a method can be conceived in which the background image conversion unit 132 performs conversion processing using the conversion matrix x calculated for each of sample color IDs. That is, the background conversion information calculation unit 139 generates background conversion information using all the conversion matrices x as representative conversion matrices X. However, in the case of this method, a hardware configuration of the information processing device 100 is likely to be complicated.

As explained above, a processing amount of the conversion processing increases as the number of representative conversion matrices increases. Therefore, the number of representative conversion matrices included in the conversion information can be set as appropriate according to, for example, a configuration of the information processing device 100, a required processing time, and required conversion accuracy.

Note that the background conversion information calculation unit 139 does not calculate a representative conversion matrix (coefficient) for each of pixels even when calculating a plurality of representative conversion matrices (coefficients). For example, the background conversion information calculation unit 139 sets several points according to a color, luminance, and the like and calculates a representative conversion matrix (coefficient) for each of set points. That is, the background conversion information calculation unit 139 divides the sample colors into a plurality of groups according to colors, luminance, and the like and calculates a representative conversion matrix for each of the groups.

In this case, the background image conversion unit 132 selects representative conversion matrices according to pixel values of a background RGB image and performs conversion processing for each of the pixels. At this time, the background image conversion unit 132 may perform correction on the representative conversion matrix, for example, weights the representative conversion matrices selected according to the pixel values.

(Conversion Table)

Note that the background conversion information calculated by the background conversion information calculation unit 139 is not limited to the conversion matrix (the conversion coefficient). For example, the background conversion information calculation unit 139 may calculate a conversion table as the background conversion information.

FIG. 8 is a diagram illustrating an example of the background conversion information calculated by the background conversion information calculation unit 139 according to the embodiment of the present disclosure. As illustrated in FIG. 8, the background conversion information calculation unit 139 calculates, as the background conversion information, a conversion table in which a four-bit RGB value and a four-bit XYZ value are associated for each of sample colors.

Note that the background conversion information calculation unit 139 may calculate a conversion table in which RGB values and XYZ values are associated in all the sample colors or may calculate a conversion table in which RGB values and XYZ values are discretely associated in a part of the sample colors. Note that the number of sample colors included in the conversion table can be set as appropriate according to, for example, a configuration of the background image conversion unit 132, a required processing time, and required conversion accuracy.

Note that, here, an example of the background conversion information is explained as the conversion information. However, display conversion information and imaging conversion information are the same. In the display conversion information, the RGB value of the background RGB image explained above is replaced with an RGB value of a display captured RGB image acquired from the captured image acquisition unit 135. In the display conversion information, the XYZ value of the color chart 620 explained above is replaced with an RGB value of a real object captured RGB image acquired from the captured image acquisition unit 135. The display conversion information includes information concerning conversion from an RGB value into an RGB value.

In the imaging conversion information, the RGB value of the background RGB image explained above is replaced with an RGB value of a display captured RGB image acquired from the captured image acquisition unit 135. The imaging conversion information includes information concerning conversion from an RGB value into an XYZ value.

Example of Conversion Processing

Figure 9:
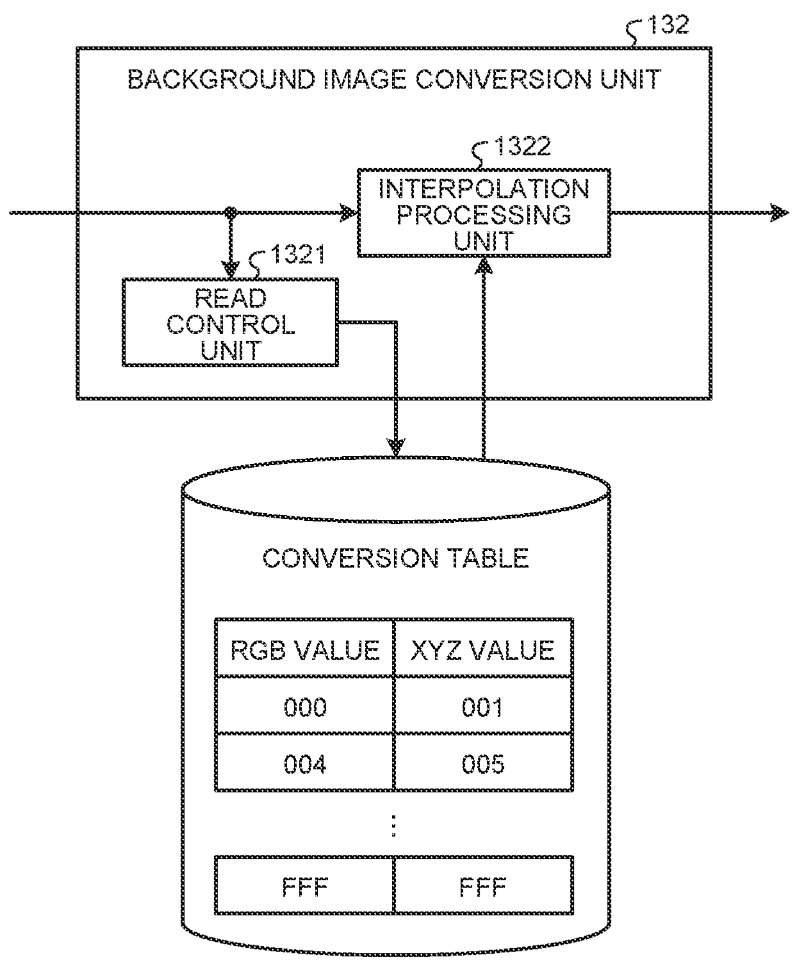
FIG. 9 is a diagram for explaining an example of conversion processing by a background image conversion unit according to the embodiment of the present disclosure.

Here, an example of conversion processing executed by the background image conversion unit 132 when the background conversion information is the conversion table is explained with reference to FIG. 9. FIG. 9 is a diagram for explaining an example of conversion processing by the background image conversion unit 132 according to the embodiment of the present disclosure. Note that the conversion processing is executed by the background image conversion unit 132. It is assumed that the conversion table is generated by the background conversion information calculation unit 139 and stored in, for example, the storage unit 120 (see FIG. 6).

As illustrated in FIG. 9, the background image conversion unit 132 includes a read control unit 1321 and an interpolation processing unit 1322.

The read control unit 1321 controls read processing for a conversion table according to pixel values of a background RGB image. When there is an RGB value that is the same as a pixel value, the read control unit 1321 performs read processing for a conversion table for outputting an XYZ value corresponding to the RGB value.

On the other hand, when there is no RGB value that is the same as the pixel value, the read control unit 1321 performs read processing for a conversion table for outputting an XYZ value corresponding to an RGB value close to the pixel value. In this case, one or a plurality of (for example, two) XYZ values may be output.

The interpolation processing unit 1322 performs interpolation processing using the XYZ value output by the read control unit 1321, converts a pixel value of an RGB image into an XYZ value, and generates a converted image.

Note that, when the interpolation processing is unnecessary, that is, when an RGB values that is the same as the pixel value is present in the conversion table, for example, the interpolation processing unit 1322 does not perform the interpolation processing and generates a converted image using an XYZ value corresponding to the RGB value as a pixel value.

For example, it is assumed that a pixel value of a predetermined pixel of the background RGB image is "004".

In this case, as illustrated in FIG. 9, the same RGB value is included in the conversion table. Therefore, the read control unit 1321 performs the read processing to output an XYZ value "005" corresponding to the RGB value "004". The interpolation processing unit 1322 generates a converted image in which the read XYZ value "005" is set as a pixel value of a predetermined pixel.

On the other hand, when there is no RGB value corresponding to the pixel value of the background RGB image, the interpolation processing unit 1322 performs interpolation processing on the output XYZ values to generate a background XYZ image.

For example, it is assumed that a pixel value of a predetermined pixel of the background RGB image is "002". As illustrated in FIG. 9, the same RGB value is not included in the conversion table. In this case, for example, the read control unit 1321 performs the read processing to output an XYZ value "001" corresponding to an RGB value "000" and the XYZ value "005" corresponding to the RGB value "004". The interpolation processing unit 1322 sets, based on the read XYZ values "001" and "005", as the pixel value of the predetermined pixel, an XYZ value calculated by performing the interpolation processing.

As explained above, the background image conversion unit 132 refers to the conversion table for each of pixels of the background RGB image and performs the interpolation processing according to necessity to generate a converted image in which pixel values are converted into XYZ values.

Note that, here, an example in which the background image conversion unit 132 converts a background RGB image into a background XYZ image using background conversion information is explained as the conversion processing. However, the display image conversion unit 134 and the captured image conversion unit 136 perform the conversion processing in the same manner.

The display image conversion unit 134 converts the background display image into a display image using display conversion information. For example, the display image conversion unit 134 refers to the conversion table for each of pixels of the background display image and performs interpolation processing according to necessity to generate a display image in which pixel values are converted into RGB values.

The captured image conversion unit 136 converts a captured RGB image into a captured XYZ image using imaging conversion information. For example, the captured image conversion unit 136 refers to the conversion table for each of pixels of the captured RGB image and performs interpolation processing according to necessity to generate a captured XYZ image in which pixel values are converted into XYZ values.

3. INFORMATION PROCESSING

3.1. Conversion Information Calculation Processing

Subsequently, information processing executed by the information processing device 100 according to the embodiment of the present disclosure is explained.

Figure 10:
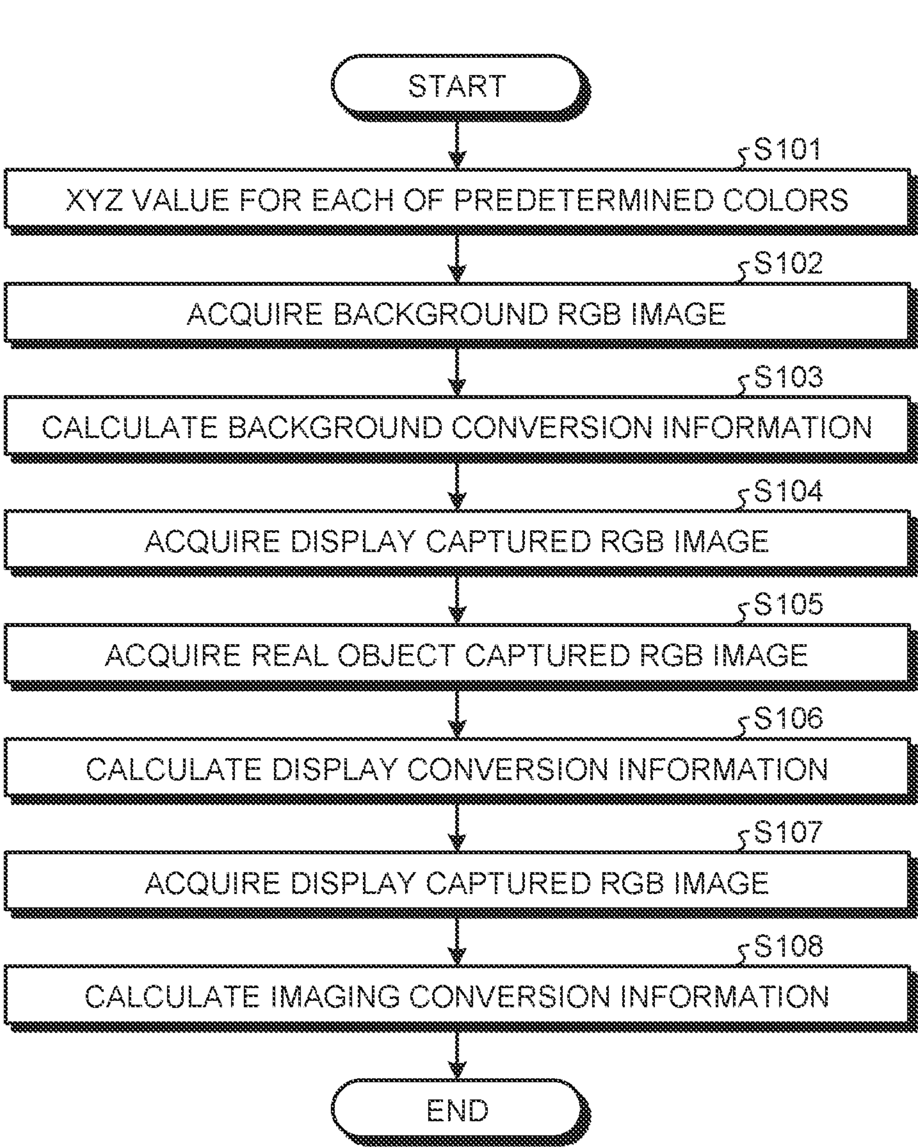
FIG. 10 is a flowchart illustrating a flow of an example of conversion information calculation processing executed by the information processing device according to the embodiment of the present disclosure.

The information processing device 100 executes, as information processing, conversion information calculation processing for calculating conversion information. For example, the information processing device 100 executes conversion information calculation processing before photographing is started. FIG. 10 is a flowchart illustrating a flow of an example of conversion information calculation processing executed by the information processing device 100 according to the embodiment of the present disclosure.

As illustrated in FIG. 10, the information processing device 100 acquires an XYZ value for each of predetermined colors (Step S101). The information processing device 100 acquires the XYZ value for each of the predetermined colors based on the spectral reflectance of an object having a predetermined color (for example, a color sample such as the color chart 620) disposed in the three-dimensional virtual space and the light source 400A in the three-dimensional space.

The information processing device 100 acquires a background RGB image obtained by the imaging device 300A imaging the object having the predetermined color (for example, the color sample such as the color chart 620) in the three-dimensional virtual space (Step S102).

The information processing device 100 calculates background conversion information using the XYZ value for each of the predetermined colors and the background RGB image (Step S103).

The information processing device 100 acquires a display captured RGB image obtained by imaging the LEDwall 200 in a state in which the object having the predetermined color (for example, the color sample such as the color chart 620) disposed in the three-dimensional virtual space is displayed on the LEDwall 200 (Step S104).

The information processing device 100 acquires a real space captured RGB image obtained by imaging the object having the predetermined color (for example, the color sample such as the color chart 620) disposed in the real space (Step S105).

The information processing device 100 calculates display conversion information using the acquired display captured RGB image and the acquired real space captured RGB image (Step S106).

The information processing device 100 acquires a display captured RGB image obtained by imaging the LEDwall 200 in the state in which the object having the predetermined color (for example, the color sample such as the color chart 620) disposed in the three-dimensional virtual space is displayed on the LEDwall 200 (Step S107). Note that, at this time, it is assumed that an image of the object having the predetermined color displayed on the LEDwall 200 is an image converted into a display image by the background conversion information.

The information processing device 100 calculates imaging conversion information using the acquired display captured RGB image and a XYZ value for each of predetermined colors (Step S108).

Note that the conversion information is desirably recalculated every time at least one of the light source 400A and the light source 400B is changed. In this case, when at least one of the light source 400A and the light source 400B is changed, the information processing device 100 executes the conversion information calculation processing illustrated in FIG. 10.

Alternatively, when a type of the light source 400A used in the three-dimensional virtual space and a type of the light source 400B used in the real space are known in advance, the information processing device 100 may calculate conversion information for each combination of the light source 400A and the light source 400B. In this case, the information processing device 100 executes the conversion information calculation processing illustrated in FIG. 10 for each combination of the light sources 400A and 400B, for example, before photographing by the imaging device 300B is started.

Note that variations in the spectral characteristics of the light sources 400A and 400B and the spectral characteristics of the imaging devices 300A and 300B affect a conversion error of coordinate conversion for an image performed using the conversion information. In addition, which sample color is used to calculate conversion information (selection of a sample color) affects robustness of the coordinate conversion.

3.2. Photographing Processing

Figure 11:
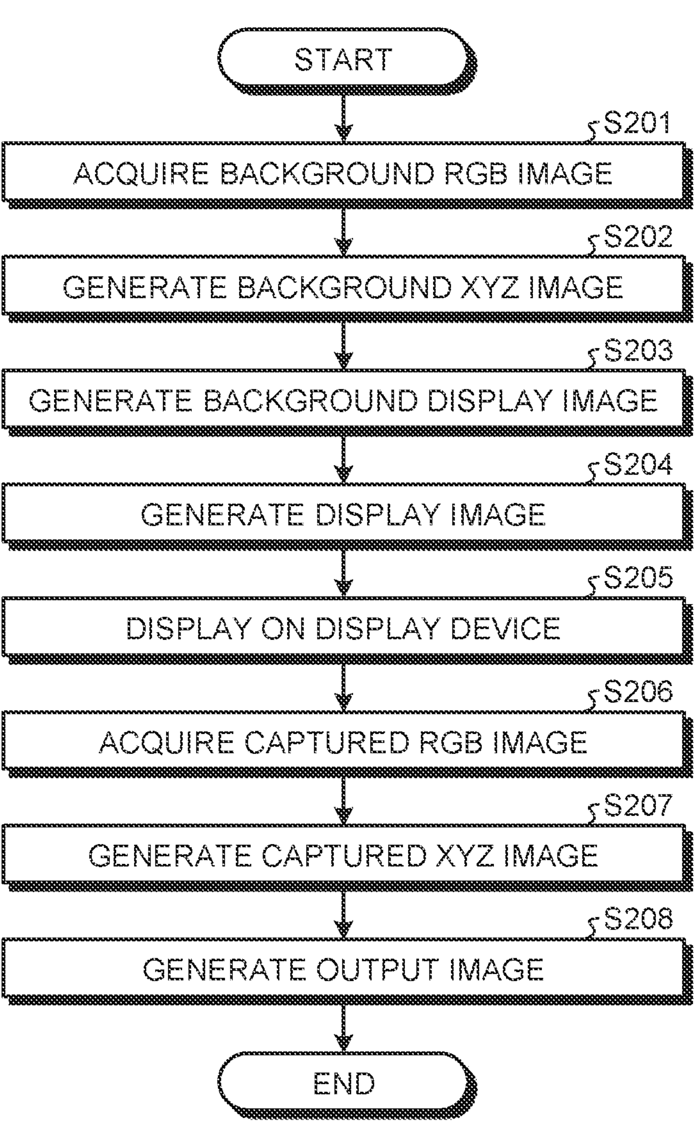
FIG. 11 is a flowchart illustrating a flow of an example of photographing processing executed by the information processing device according to the embodiment of the present disclosure.

The information processing device 100 executes photographing processing as information processing. FIG. 11 is a flowchart illustrating a flow of an example of photographing processing executed by the information processing device 100 according to the embodiment of the present disclosure. For example, when photographing is started, the information processing device 100 executes the photographing processing.

The information processing device 100 acquires a background RGB image obtained by photographing the three-dimensional virtual space with the imaging device 300A (Step S201). The information processing device 100 coordinate-converts the acquired background RGB image using background conversion information to generate a background XYZ image (Step S202). The information processing device 100 generates, based on the background XYZ image, a background display image to be displayed on the display device 200 (Step S203). The information processing device 100 converts the background display image using display conversion information to generate a display image (Step S204). The information processing device 100 causes the display device 200 to display the display image (Step S205).

The information processing device 100 acquires a captured RGB image obtained by the imaging device 300B imaging the real space including the display device 200 (Step S206). The information processing device 100 converts the captured RGB image using imaging conversion information to generate a captured XYZ image (Step S207). The information processing device 100 converts the captured XYZ image into an image having an RGB value to generate an output image (Step S208).

Note that the information processing device 100 can execute the photographing processing at a predetermined period such as a predetermined frame rate. Alternatively, when the imaging devices 300A and 300B photograph a moving image, the information processing device 100 may perform the photographing processing for each one moving image data (for example, moving image data photographed in a predetermined period).

For example, the information processing device 100 collectively converts background RGB images in the predetermined period generated or photographed in advance into background XYZ images. Similarly, the information processing device 100 collectively converts background XYZ images in the predetermined period into background display images and converts the background display images into display images. Note that the information processing device 100 may execute processing up to the generation of the display image in advance before imaging by the imaging device 300B is started.

While the display image after the conversion is displayed on the display device 200, the information processing device 100 acquires, as a captured RGB image, a moving image photographed by the imaging device 300B in the predetermined period. The information processing device 100 collectively converts the photographed captured RGB images in the predetermined period into captured XYZ images and converts the captured XYZ images into output images. Note that, after an end of imaging by the imaging device 300B, the information processing device 100 may execute processing subsequent to the processing for generating the captured XYZ image.

As explained above, the information processing device 100 of the information processing system 10 according to the present embodiment includes the control unit 130. The control unit 130 converts a background image (an example of the first image) photographed by the imaging device 300A (an example of the first imaging device) in the three-dimensional virtual space (an example of the first space) into a display image to be displayed on the display device 200 disposed in the real space (an example of the second space) based on display conversion information (an example of the first conversion information). The control unit 130 acquires a captured image (an example of the second image) photographed by the imaging device 300A (an example of the second imaging device) to include the display device 200 that displays the display image.

The display conversion information is calculated based on an RGB value of a display captured RGB image (an example of the first color image) obtained by photographing an image (a color chart image) having a predetermined color displayed on the display device 200 with the imaging device 300A and an RGB value of a real object captured RGB image (an example of the second color image) obtained by photographing an object (a color chart) having a predetermined color disposed in the real space with the imaging device 300B.

Consequently, the information processing device 100 can align a hue at the time when the display device 200 is photographed again and a hue at the time when the real space is photographed. Therefore, the information processing device 100 can acquire an image (an output image) with higher reality.

The control unit 130 of the information processing device 100 converts an RGB value of a background RGB image into an XYZ value based on background conversion information (an example of the second conversion information). The control unit 130 converts a background XYZ image having the XYZ value into a display image based on display conversion information.

The background conversion information is calculated based on an RGB value of a background RGB image (an example of the third color image) obtained by photographing an object (a color chart) having a predetermined color in the three-dimensional virtual space with the imaging device 300A and an XYZ value of a predetermined color.

Consequently, the information processing device 100 can align a hue of the object disposed in the three-dimensional virtual space and a hue at the time when a photographed image obtained by photographing the object in the three-dimensional virtual space is displayed on the display device.

The control unit 130 of the information processing device 100 converts an RGB values of a captured RGB image (an example of the second image) into an XYZ value based on imaging conversion information (an example of the third conversion information), and acquires a captured XYZ image (an example of the third image).

The imaging conversion information is calculated based on the XYZ value of the predetermined color in the three-dimensional virtual space and the RGB value of at least one of the display captured RGB image and the real object captured RGB image.

Consequently, the information processing device 100 can align an actual hue in the three-dimensional virtual space and a hue at the time when the real space is photographed.

4. MODIFICATIONS

In the embodiment explained above, the information processing device 100 converts the background XYZ image into the background display image and then converts the background display image into the display image using the display conversion information but is not limited thereto. For example, the information processing device 100 may convert the background XYZ image into a display RGB image (an example of the fifth image) using the display conversion information and convert the display RGB image into a display image corresponding to the display device 200. In this case, the display conversion information is information for converting an XYZ value into an RGB value.

Figure 12:
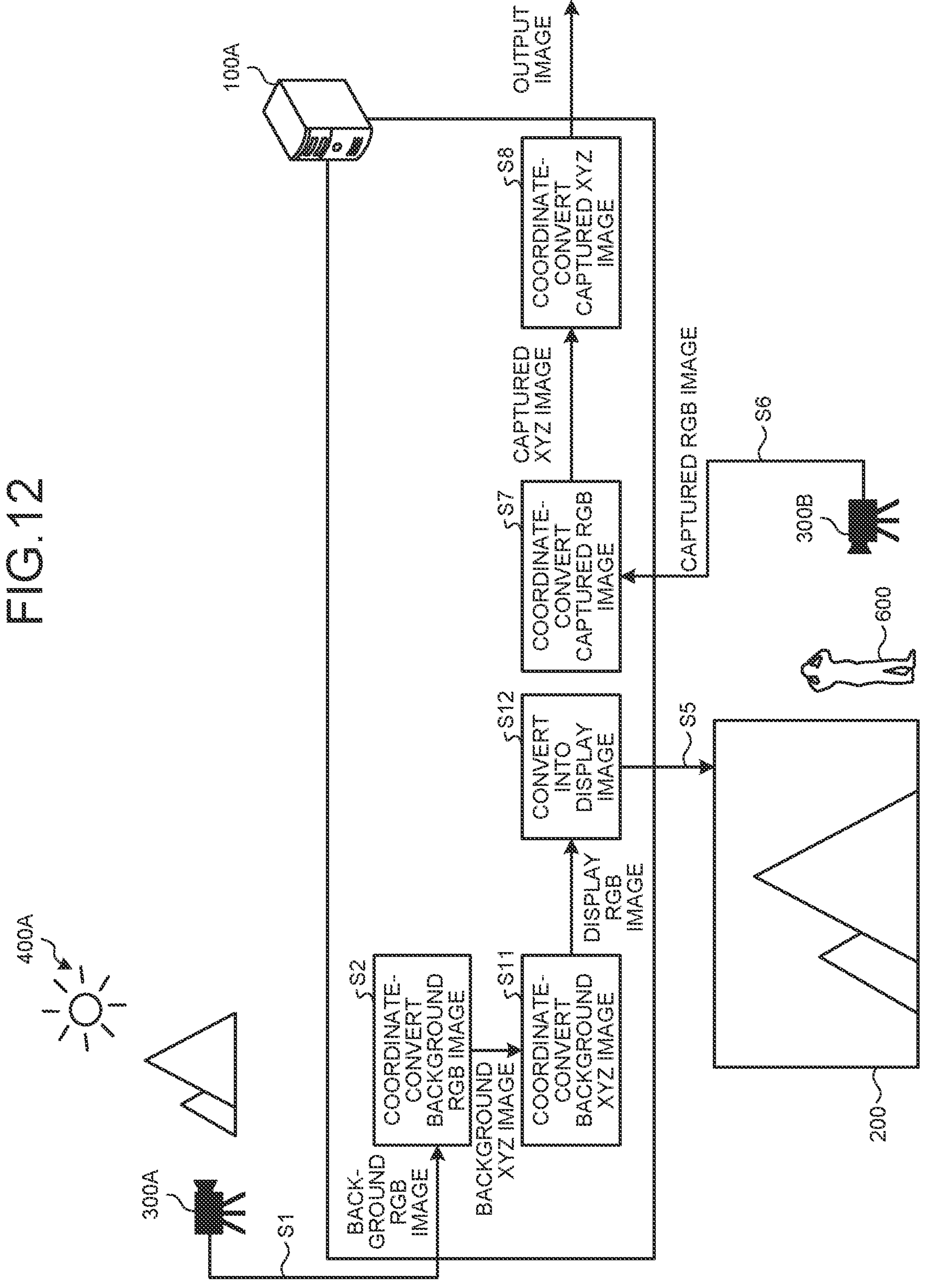
FIG. 12 is a diagram for explaining an overview of photographing processing according to a modification of the embodiment of the present disclosure.

FIG. 12 is a diagram for explaining an overview of photographing processing according to a modification of the embodiment of the present disclosure. Note that the same processing as the processing of the photographing processing illustrated in FIG. 4 is denoted by the same reference signs and explanation of the processing is omitted. The photographing processing illustrated in FIG. 12 is executed by an information processing device 100A according to the modification of the embodiment of the present disclosure.

In Step S2 illustrated in FIG. 12, the information processing device 100A that has coordinate-converted the background RGB image into the background XYZ image using the background conversion information performs coordinate conversion using the display conversion information to generate a display RGB image (Step S11).

The information processing device 100A generates a display image corresponding to the display device 200 based on the display RGB image (Step S12). The information processing device 100A causes the display device 200 to display the generated display image.

Note that the display conversion information is conversion information for matching an RGB value of a display captured RGB image and an RGB value of a real object captured RGB image. The information processing device 100 calculates display conversion information based on the background XYZ image and the real object captured RGB image.

Figure 13:
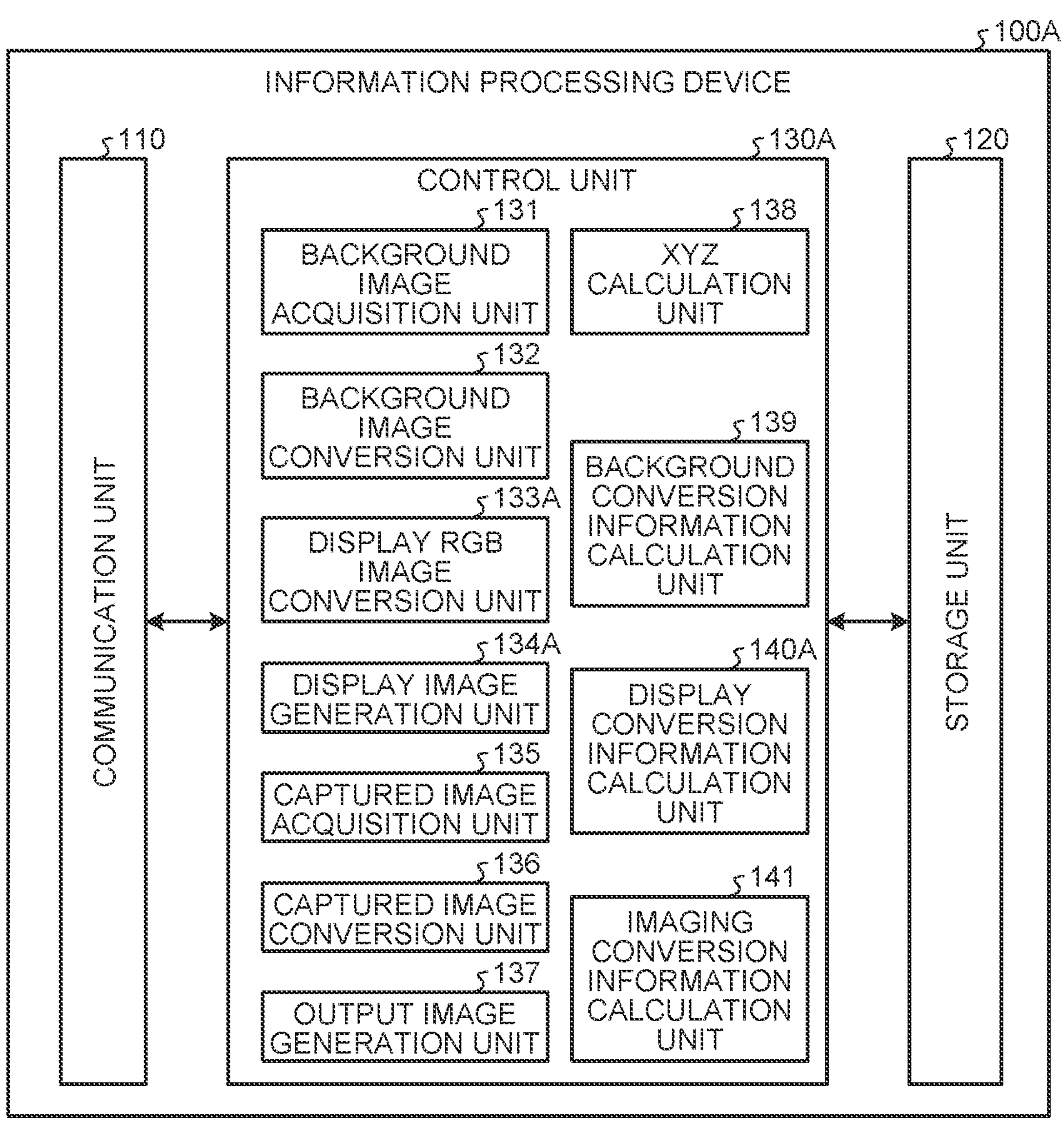
FIG. 13 is a block diagram illustrating a configuration example of an information processing device according to a modification of an embodiment of the present disclosure.

FIG. 13 is a block diagram illustrating a configuration example of the information processing device 100A according to the modification of the embodiment of the present disclosure. A control unit 130A of the information processing device 100A illustrated in FIG. 13 includes a background RGB image conversion unit 133A instead of the background display image conversion unit 133 illustrated in FIG. 6 and includes a display image generation unit 134A instead of the display image conversion unit 134 illustrated in FIG. 6. The control unit 130A includes a display conversion information calculation unit 140A.

The background RGB image conversion unit 133A converts a background XYZ image acquired from the background image conversion unit 132 into a display RGB image using display conversion information. The background RGB image conversion unit 133A outputs the converted display RGB image to the display image generation unit 134A.

The display image generation unit 134A converts the display RGB image acquired from the background RGB image conversion unit 133A into a display image having an RGB value in order to display the display RGB image on the LEDwall 200. Note that the information for converting the display RGB image into the display image is assumed to be stored in the storage unit 120 in advance. The display image generation unit 134A displays the display image on the LEDwall 200.

The display conversion information calculation unit 140A calculates display conversion information using the display captured RGB image (or the background XYZ image) acquired from the captured image acquisition unit 135 and the real object captured RGB image acquired from the captured image acquisition unit 135. The display conversion information is, for example, information for associating an XYZ value of a background XYZ image and an RGB value of a real object captured RGB image for each of the sample colors included in the color chart 620.

The display conversion information calculation unit 140 outputs the calculated display conversion information to the background RGB image conversion unit 133A.

5. OTHER EMBODIMENTS

The embodiments explained above and modifications indicate examples, and various modifications and applications are possible.

For example, the control device that controls the information processing device 100 of the present embodiment may be realized by a dedicated computer system or may be realized by a general-purpose computer system.

For example, a communication program for executing the operation explained above is distributed by being stored in a computer-readable recording medium such as an optical disk, a semiconductor memory, a magnetic tape, or a flexible disk. Then, for example, the program is installed in a computer and the control device is configured by executing the processing explained above. At this time, the control device may be a device outside the information processing device 100 (for example, a personal computer). The control device may be a device (for example, the control unit 130) inside the information processing device 100.

The communication program explained above may be stored in a disk device included in a server device on a network such as the Internet such that the communication program can be downloaded to a computer. The functions explained above may be implemented by cooperation of an OS (Operating System) and application software. In this case, a portion other than the OS may be stored in a medium and distributed or the portion other than the OS may be stored in the server device such that the portion can be downloaded to the computer.

Among the kinds of processing explained in the embodiment, all or a part of the processing explained as being automatically performed can be manually performed or all or a part of the processing explained as being manually performed can be automatically performed by a publicly-known method. Besides, the processing procedures, the specific names, and the information including the various data and parameters explained in the document and illustrated in the drawings can be optionally changed except when specifically noted otherwise. For example, the various kinds of information illustrated in the figures are not limited to the illustrated information.

The illustrated components of the devices are functionally conceptual and are not always required to be physically configured as illustrated in the figures. That is, specific forms of distribution and integration of the devices are not limited to the illustrated forms and all or a part thereof can be functionally or physically distributed and integrated in any unit according to various loads, usage situations, and the like. Note that this configuration by the distribution and the integration may be dynamically performed.

The embodiments explained above can be combined as appropriate in a range for not causing the processing contents to contradict one another. In addition, the order of the steps illustrated in the flowchart and the like of the embodiment explained above can be changed as appropriate.

For example, the present embodiment can be implemented as any configuration configuring a device or a system, for example, a processor functioning as a system LSI (Large Scale Integration) or the like, a module using a plurality of processors or the like, a unit using a plurality of modules or the like, a set obtained by further adding other functions to the unit, and the like (that is, a configuration of a part of the device).

Note that, in the present embodiment, the system means a set of a plurality of components (devices, modules (parts), and the like) It does not matter whether all the components are present in the same housing. Therefore, both of a plurality of devices housed in separate housings and connected via a network and one device in which a plurality of modules are housed in one housing are systems.

For example, the present embodiment can adopt a configuration of cloud computing in which one function is shared and processed by a plurality of devices in cooperation via a network.

6. Conclusion

Although the embodiment of the present disclosure is explained above, the technical scope of the present disclosure is not limited to the embodiment as it is, and various modifications can be made without departing from the gist of the present disclosure. Components in different embodiments and modifications may be combined as appropriate.

The effects in the embodiments described in this specification are only illustrations and are not limited. Other effects may be present.

Note that the present technology can also take the following configurations.

(1)

An information processing device comprising a control unit that converts, based on first conversion information, a first image photographed by a first imaging device in a first space into a display image to be displayed on a display device disposed in a second space and acquires a second image photographed by a second imaging device to include the display device that displays the display image, wherein the first conversion information is calculated based on an RGB value of a first color image obtained by photographing an image having a predetermined color displayed on the display device with the second imaging device and the RGB value of a second color image obtained by photographing an object having the predetermined color disposed in the second space with the second imaging device.

(2)

The information processing device according to (1), wherein the control unit converts the RGB values of the first image into an XYZ value based on second conversion information and converts a first image having the XYZ value into the display image based on the first conversion information, and the second conversion information is calculated based on an RGB value of a third color image obtained by photographing the object having the predetermined color in the first space with the first imaging device and the XYZ value of the predetermined color.

(3)

The information processing device according to (1) or (2), wherein the control unit converts the RGB value of the second image into an XYZ value based on third conversion information and acquires a third image, and the third conversion information is calculated based on the XYZ value of the predetermined color in the first space and the RGB value of at least one of the first color image and the second color image.

(4)

The information processing device according to any one of (1) to (3), wherein the control unit converts the first image having an XYZ value into a display RGB image to be displayed on the display device and converts the display RGB image into the display image based on the first conversion information.

(5)

The information processing device according to any one of (1) to (3), wherein the control unit converts the first image having an XYZ value into a fourth image having a RGB value based on first conversion information and converts the fourth image into the display image.

(6)

The information processing device according to any one of (1) to (5), wherein the first space is a virtual space, and the first image is a captured image obtained by photographing the virtual space.

(7)

The information processing device according to any one of (1) to (6), wherein the first space is a real space, and the first image is a captured image obtained by photographing the real space.

(8)

The information processing device according to any one of (1) to (7), wherein the second space is a real space, and the second image is an image photographed to include the display image displayed on the display device and a real object disposed in the real space.

(9)

The information processing device according to any one of (1) to (8), wherein the first space is a space in a place different from the second space.

(10)

An information processing method comprising:

converting, based on first conversion information, a first image captured by a first imaging device in a first space into a display image to be displayed on a display device disposed in a second space; and acquiring a second image photographed by a second imaging device to include the display device that displays the display image, wherein the first conversion information is calculated based on an RGB value of a first color image obtained by photographing an image having a predetermined color displayed on the display device with the second imaging device and the RGB value of a second color image obtained by photographing an object having the predetermined color disposed in the second space with the second imaging device.

REFERENCE SIGNS LIST

10 INFORMATION PROCESSING SYSTEM
100 INFORMATION PROCESSING DEVICE
110 COMMUNICATION UNIT
120 STORAGE UNIT
130 CONTROL UNIT
200 DISPLAY DEVICE
300 IMAGING DEVICE
400 LIGHT SOURCE

The invention claimed is:

1. An information processing device, comprising
a control unit configured to:
convert, based on first conversion information, a first image photographed by a first imaging device in a first space into a display image to be displayed on a display device in a second space;
acquire a second image photographed by a second imaging device to include the display device that displays the display image, wherein the first conversion information is based on
an RGB value of a first color image obtained by photographing an image having a specific color displayed on the display device with the second imaging device, and
an RGB value of a second color image obtained by photographing an object having the specific color in the second space with the second imaging device;
convert the RGB value of the first image into an XYZ value based on second conversion information; and
convert the first image having the XYZ value into the display image based on the first conversion information, wherein the second conversion information is based on
an RGB value of a third color image obtained by photographing the object having the specific color in the first space with the first imaging device, and
the XYZ value of the specific color.

2. The information processing device according to claim 1, wherein the control unit is further configured to:
convert an RGB value of the second image into an XYZ value, based on third conversion information; and
acquire a third image, wherein
the third conversion information is based on the XYZ value of the specific color in the first space and at least one of the RGB value of the first color image or the RGB value of the second color image.

3. The information processing device according to claim 1, wherein
the control unit is further configured to:
convert an RGB value of the second image into an XYZ value, based on third conversion information; and
acquire a third image,
the third conversion information is based on the XYZ value of the specific color in the first space and at least one of the RGB value of the first color image or the RGB value of the second color image.

4. The information processing device according to claim 1, wherein the control unit is further configured to:
convert the first image having the XYZ value into a fourth image to be displayed on the display device; and
convert the fourth image into the display image based on the first conversion information.

5. The information processing device according to claim 1, wherein the control unit is further configured to:
convert the first image having the XYZ value into a fifth image having an RGB value, based on the first conversion information; and
convert the fifth image into the display image.

6. The information processing device according to claim 1, wherein
the first space is a virtual space, and
the first image is a captured image of the virtual space.

7. The information processing device according to claim 1, wherein
the first space is a real space, and
the first image is a captured image of the real space.

8. The information processing device according to claim 1, wherein
the second space is a real space, and
the second image includes the display image displayed on the display device and a real object in the real space.

9. The information processing device according to claim 1, wherein the first space is a space in a place different from a place of the second space.

10. An information processing method, comprising:
converting, based on first conversion information, a first image captured by a first imaging device in a first space into a display image to be displayed on a display device in a second space;
acquiring a second image photographed by a second imaging device to include the display device that displays the display image, wherein the first conversion information is based on
an RGB value of a first color image obtained by photographing an image having a specific color displayed on the display device with the second imaging device, and
an RGB value of a second color image obtained by photographing an object having the specific color in the second space with the second imaging device;
converting the RGB value of the first image into an XYZ value based on second conversion information; and
converting the first image having the XYZ value into the display image based on the first conversion information, wherein the second conversion information is based on
an RGB value of a third color image obtained by photographing the object having the specific color in the first space with the first imaging device, and
the XYZ value of the specific color.

* * * * *